United States Patent
Daiku

(10) Patent No.: US 11,750,747 B2
(45) Date of Patent: Sep. 5, 2023

(54) INSPECTION APPARATUS CAPABLE OF PREVENTING LOWERING OF POSITION MATCHING ACCURACY, METHOD OF CONTROLLING SAME, AND STORAGE MEDIUM

(71) Applicant: CANON KABUSHIKI KAISHA, Tokyo (JP)

(72) Inventor: Yuki Daiku, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/889,631

(22) Filed: Aug. 17, 2022

(65) Prior Publication Data

US 2023/0065425 A1 Mar. 2, 2023

(30) Foreign Application Priority Data

Aug. 27, 2021 (JP) .................................. 2021-138952
Aug. 3, 2022 (JP) ................................. 2022-124219

(51) Int. Cl.
*H04N 1/00* (2006.01)
*H04N 1/32* (2006.01)
*B41F 33/00* (2006.01)

(52) U.S. Cl.
CPC ..... *H04N 1/00005* (2013.01); *B41F 33/0036* (2013.01); *H04N 1/00092* (2013.01); *H04N 1/00681* (2013.01); *H04N 1/32609* (2013.01)

(58) Field of Classification Search
None
See application file for complete search history.

(56) References Cited

U.S. PATENT DOCUMENTS

| | | | |
|---|---|---|---|
| 2002/0041383 A1* | 4/2002 | Lewis, Jr. | H04N 23/81 358/1.9 |
| 2006/0110009 A1* | 5/2006 | Klassen | H04N 1/00087 382/162 |
| 2020/0234422 A1 | 7/2020 | Esumi et al. | |
| 2021/0304385 A1* | 9/2021 | Nakada | B41F 33/0036 |
| 2022/0028047 A1* | 1/2022 | Mashiko | H04N 1/00034 |
| 2022/0329700 A1* | 10/2022 | Tashiro | H04N 1/00084 |

FOREIGN PATENT DOCUMENTS

JP 2020118497 A 8/2020

* cited by examiner

*Primary Examiner* — Miya J Williams
(74) *Attorney, Agent, or Firm* — ROSSI, KIMMS & McDOWELL LLP

(57) ABSTRACT

An inspection apparatus capable of preventing lowering of position matching accuracy. Control points are positioned in a lattice form on a scanned image of a print product, for performing position matching between the scanned image and a reference image registered in advance. An approximate line of a column and an approximate line of a row intersecting the approximate line of the column are calculated based on two or more control points positioned in the same column and the same row as one control point. One control point determined to be corrected is corrected based on the respective approximate lines of the column and the row. The print product is inspected by comparing a position-matched scanned image generated based on the control points including position-corrected control points and position-updated control points, and the reference image.

14 Claims, 20 Drawing Sheets

*FIG. 8A1*
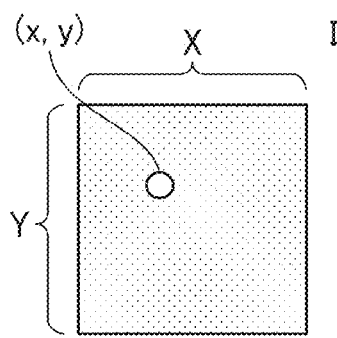
*FIG. 8A3*
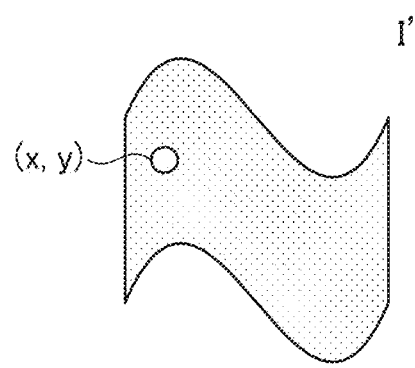
*FIG. 8A2*
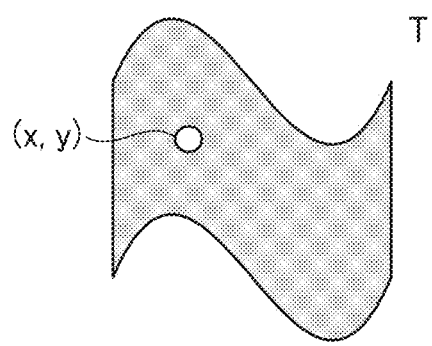

FIG. 8B1
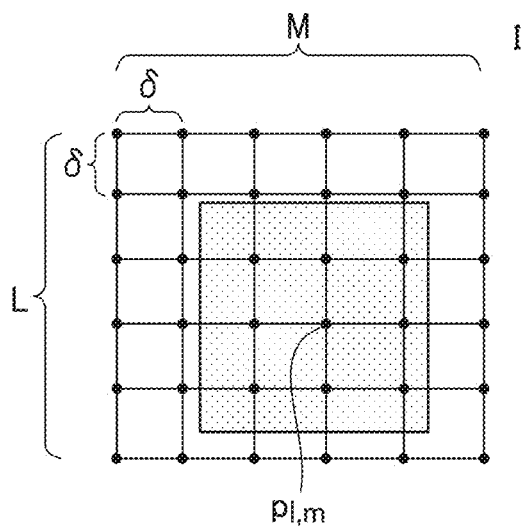
FIG. 8B3
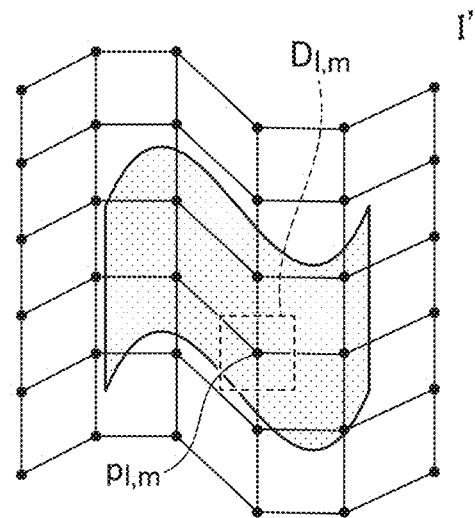
FIG. 8B2
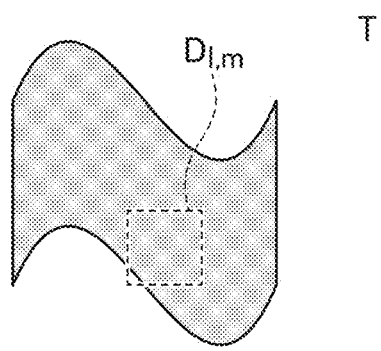

INSPECTION APPARATUS CAPABLE OF PREVENTING LOWERING OF POSITION MATCHING ACCURACY, METHOD OF CONTROLLING SAME, AND STORAGE MEDIUM

BACKGROUND OF THE INVENTION

Field of the Invention

The present invention relates to an inspection apparatus capable of preventing lowering of position matching accuracy, a method of controlling the inspection apparatus, and a storage medium.

Description of the Related Art

In a print product delivered from a printing apparatus, there arises a case where a stain is caused by attachment of color material, such as ink or toner, to an unintended place. There also arises a case where a sufficient amount of color material fails to be attached to places where an image is to be formed, causing color loss in which the color is made thinner than it ought to be. Such a so-called print defect, including stain or color loss, lowers the quality of a print product. To ensure the quality of a print product, inspection of a print product for a defect is performed.

Visual inspection in which an inspector visually inspects whether or not there is a defect requires lots of time and cost, and hence, in recent years, an inspection system has been proposed which automatically performs inspection, without resort to visual inspection. In the inspection system that automatically performs inspection, there is used a method of reading an image of a print output, using a scanner, and comparing the read image with a comparison image (reference image). In a case where image inspection is performed by comparing images with each other, the position matching (i.e. alignment) of the images has large influence on the accuracy of inspection, and hence it is important to perform position matching with accuracy.

As a general position matching technique, rigid body alignment is known in which feature points are extracted and projection transformation of the feature points is performed. For example, Japanese Laid-Open Patent Publication (Kokai) No. 2020-1118497 discloses a method of extracting feature points at leading and trailing ends of an image in the feeding direction and performing alignment by rigid body transformation. However, the position matching (i.e. alignment) by rigid body transformation cannot correct local positional misalignment caused by uneven conveyance and elongation of paper. On the other hand, as a higher accuracy position matching technique, there is known non-rigid body alignment, such as alignment by free-form deformation (FFD). By using non-rigid body alignment, it is possible to correct not only misalignment caused by shift or rotation of an image but also misalignment caused by local magnification or misalignment. Therefore, compared with alignment (position matching) by rigid body transformation, alignment by non-rigid body transformation is capable of performing higher accuracy position matching.

In free-form deformation, a plurality of control points for controlling the shape of an image are positioned in a lattice form on the image and image deformation is performed by moving each single control point. In free-form deformation, to perform deformation for alignment (position matching) between an inspection target image and a reference image, differences between the images are calculated, and the positions of the control points are sequentially updated in a direction in which the differences are reduced to the minimum.

However, conventionally, in a case where an inspection target image has a defect of existence of a color similar to a color of a picture, in the vicinity of the picture, the defect is processed as part of the picture and the positions of the control points are updated such that the differences are reduced to the minimum. As a result, controls points in the vicinity of the defect are displaced to unexpected places, causing the problem of lowered position matching accuracy, such as sinking of the defect into the picture.

SUMMARY OF THE INVENTION

The invention provides an inspection apparatus that is capable of preventing lowering of position matching accuracy, a method of controlling the inspection apparatus, and a storage medium.

In a first aspect of the invention, there is provided an inspection apparatus that inspects, based on a reference image registered in advance, whether there is a defect in a print product, including at least one processor, and a memory coupled to the at least one processor, the memory having instructions that, when executed by the processor, perform the operations as: a control point positioning unit configured to position a plurality of control points in a lattice form on a scanned image of the print product generated by reading the print product, for performing position matching between the scanned image and the reference image, an update unit configured to update positions of the plurality of control points, an approximate line calculation unit configured to calculate an approximate line of a column based on two or more control points positioned in a same column as one control point of the plurality of control points, and an approximate line of a row intersecting the approximate line of the column based on two or more control points positioned in a same row as the one control point, a determination unit configured to determine whether or not the one control point is to be corrected, a correction unit configured to correct the position of the one control point that is determined to be corrected by the determination unit, based on the approximate line of the column and the approximate line of the row, and an inspection process unit configured to inspect whether there is a defect in the print product, by comparing a position-matched scanned image generated based on the plurality of control points including control points of which positions have been corrected by the correction unit and control points of which positions have been updated by the update unit, and the reference image.

In a second aspect of the invention, there is provided a method of controlling an inspection apparatus that inspects, based on a reference image registered in advance, whether there is a defect in a print product, including positioning a plurality of control points in a lattice form on a scanned image of the print product generated by reading the print product, for performing position matching between the scanned image and the reference image, updating positions of the plurality of control points, calculating an approximate line of a column based on two or more control points positioned in a same column as one control point of the plurality of control points, and an approximate line of a row intersecting the approximate line of the column based on two or more control points positioned in a same row as the one control point, determining whether or not the one control point is to be corrected, correcting the position of the one control point that is determined to be corrected by said determining, based on the approximate line of the column and the approximate line of the row, and inspecting whether there is a defect in the print product, by comparing a position-matched scanned image generated based on the plurality of control points including control points of which positions have been corrected by said correcting and control points of which positions have been updated by said updating, and the reference image.

According to the present invention, it is possible to prevent lowering of position matching accuracy.

Further features of the present invention will become apparent from the following description of exemplary embodiments (with reference to the attached drawings).

BRIEF DESCRIPTION OF THE DRAWINGS

FIGS. 8A1 to 8A3, FIGS. 8B1 to 8B3, and FIG. 8C are diagrams useful in explaining an example of the position matching process in FIG. 7.

DESCRIPTION OF THE EMBODIMENTS

The present invention will now be described in detail below with reference to the accompanying drawings showing embodiments thereof.

Figure 1:
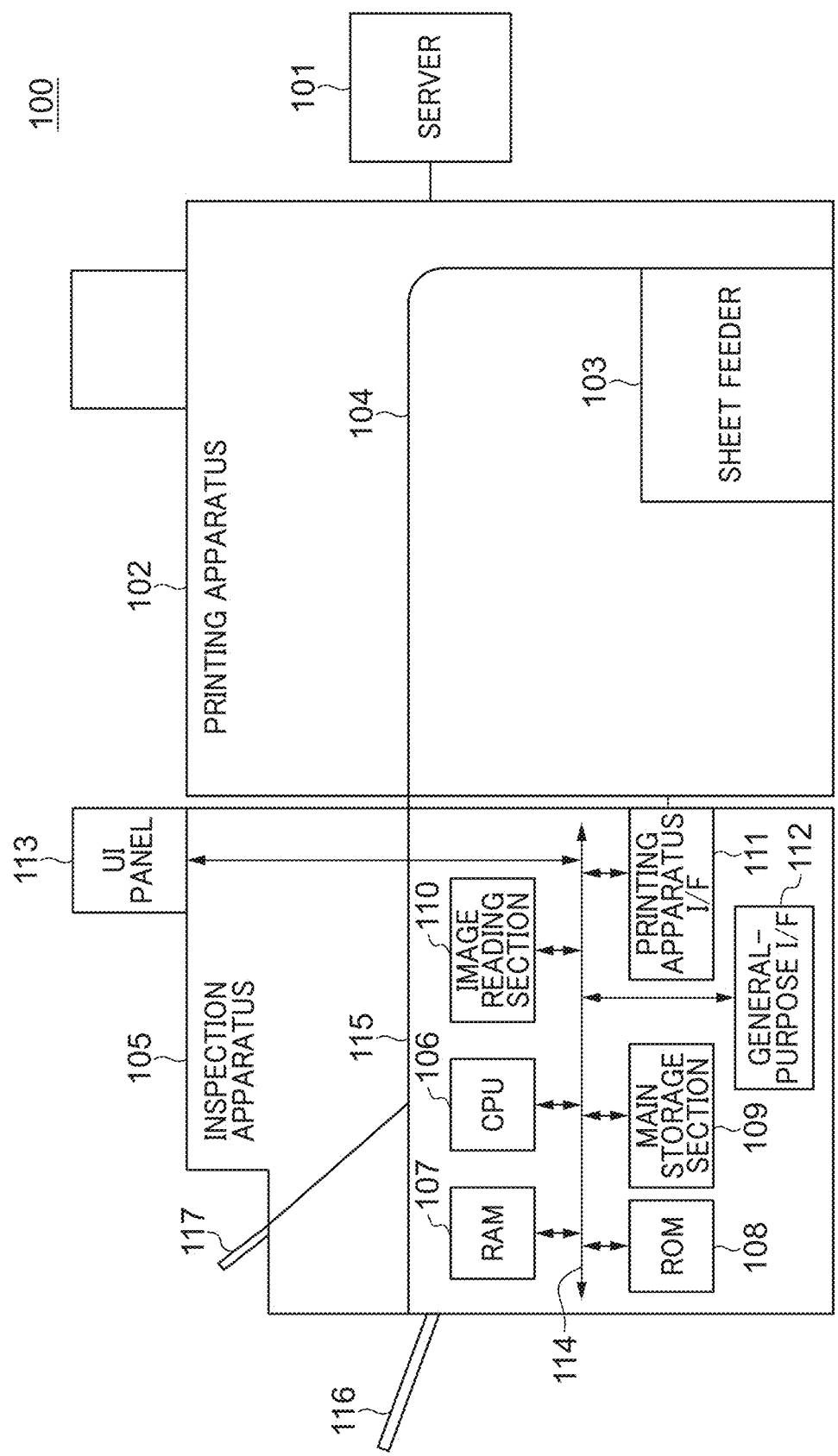
FIG. 1 is a diagram showing the configuration of an inspection system including an inspection apparatus according to a first embodiment of the invention.

FIG. 1 is a diagram showing the configuration of an inspection system 100 including an inspection apparatus 105 according to a first embodiment of the invention. In FIG. 1, the inspection system 100 includes a server 101, a printing apparatus 102, and the inspection apparatus 105. In the inspection system 100, the printing apparatus 102 outputs a print product based on print job data generated by the server 101, and the inspection apparatus 105 inspects whether or not there is a defect in the print product.

The server 101 generates print job data and transmits the generated print job data to the printing apparatus 102. The server 101 has a plurality of external apparatuses, not shown, communicably connected thereto via a network. The server 101 receives requests for generating print job data from these external apparatuses.

The printing apparatus 102 forms an image on a sheet based on print job data received from the server 101. Note that although in the present embodiment, a description is given of a configuration in which the printing apparatus 102 uses an electrophotographic method, this is not limitative, but there may be used another printing method, such as an offset printing method or an inkjet method. The printing apparatus 102 includes a sheet feeder 103. The sheet feeder 103 has sheets set therein by a user in advance. Based on print job data received from the server 101, the printing apparatus 102 conveys the sheets set in the sheet feeder 103 one by one along a conveyance path 104, forms an image on one side or on each of both sides of each sheet, and delivers a print product on which the image is formed, to the inspection apparatus 105.

The inspection apparatus 105 includes a CPU 106, a RAM 107, a ROM 108, a main storage section 109, an image reading section 110, a printing apparatus interface 111, a general-purpose interface 112, and an user interface panel 113. The CPU 106, the RAM 107, the ROM 108, the main storage section 109, the image reading section 110, the printing apparatus interface 111, the general-purpose interface 112, and the user interface panel 113 are connected to each other via a main bus 114. Further, the inspection apparatus 105 includes a conveyance path 115 connected to the conveyance path 104, an output tray 116, and an output tray 117.

The CPU 106 is a processor that controls the whole printing apparatus 105. The RAM 107 functions as a main memory, a work area, or the like. The ROM 108 stores a plurality of programs to be executed by the CPU 106. The main storage section 109 stores applications to be executed by the CPU 106, and data to be used for image processing, and so forth. The image reading section 110 reads one side or both sides of a print product delivered from the printing apparatus 102, as an inspection target, to thereby form a scanned image of the print product. Specifically, the image reading section 110 reads one side or both sides of the print product being conveyed, by using one or more reading sensors (not shown) provided in the vicinity of the conveyance path 115. One reading sensor may be provided on only one side of the conveyance path 115 which corresponds to the one side of the print product being conveyed or two reading sensors may be provided on both sides of the conveyance path 115 which correspond to front and reverse sides of the print product being conveyed, respectively, so as to simultaneously read both sides of the print product. In a configuration in which one reading sensor is provided on one side of the conveyance path 115, the print product having one side thereof subjected to reading is conveyed into a double-sided conveyance path, not shown, in the conveyance path 115, thereby inverting the print product, and then the reading sensor reads the other side of the print product.

The printing apparatus interface 111 is connected to the printing apparatus 102, thereby performing synchronization of processing timing between the printing apparatus 102 and a print product or mutually notifying an operational status to each other. The general-purpose user interface 112 is a serial bus interface, such as USB interface or IEEE1394 interface. For example, by connecting a USB memory to the general-purpose interface 112, data, such as a log, stored in the main storage section 109 can be written into the USB memory, whereafter the USB memory storing the data can be taken out, and the data stored in the USB memory can be caused to be read into the inspection apparatus 105. The user interface panel 113 is, for example, a liquid crystal display (display section). The user interface panel 113 functions as a user interface of the inspection apparatus 105 and displays the present status or settings of the inspection apparatus 105 for notification to the user. Further, the user interface panel 113 is a liquid crystal display of a touch panel, and buttons displayed thereon allow the user to operate any of them so as to receive an instruction from the user.

Figure 2:
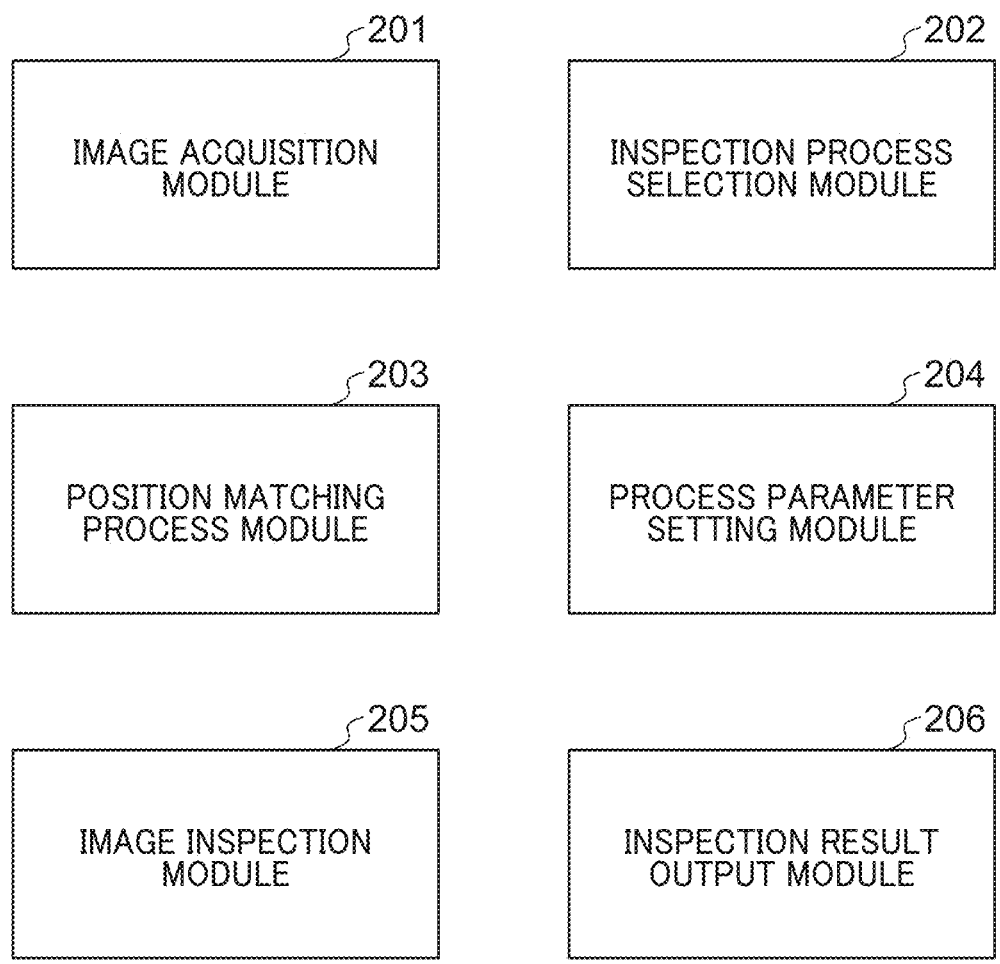
FIG. 2 is a schematic block diagram showing software modules of the inspection apparatus appearing in FIG. 1.

In the inspection apparatus 105, the image reading section 110 reads a print product delivered from the printing apparatus 102 as an inspection target, and generates a scanned image (hereinafter referred to as the inspection target image) of the print product. Further, in the inspection apparatus 105, an image inspection module 205, described hereinafter with reference to FIG. 2, compares the inspection target image with the reference image registered as the correct answer image in advance to thereby inspect whether or not there is a defect in the print product. The defect in the print product refers to a cause lowering the quality of the print product, such as a stain formed by attachment of color material, such as ink or toner, to an unintended portion, color loss in which color material fails to be sufficiently attached to a portion where image is to be formed, making the color thinner than it ought to be, or the like. The inspection apparatus 105 delivers a print product having successfully passed the inspection to the output tray 116, and a print product having not successfully passed the inspection to the output tray 117. Thus, only products guaranteed to have a predetermined quality can be collected into the output tray 116 as deliverables.

FIG. 2 is a schematic block diagram showing software modules of the inspection apparatus 105 in FIG. 1. The inspection apparatus 105 includes, as software modules in FIG. 2, an image acquisition module 201, an inspection process selection module 202, a position matching process module 203, a process parameter setting module 204, the image inspection module 205, and an inspection result output module 206. Processes performed by these modules are realized by the CPU 106 that executes programs stored in the ROM 108 by loading the same into the RAM 107.

The image acquisition module 201 acquires an inspection target image from the image reading section 110. Further, the image acquisition module 201 acquires the reference image registered as the correct answer image in advance from the RAM 107 or the main storage section 109. The inspection process selection module 202 selects a defect detection process based on the information input by the user to a selection screen (not shown) displayed on the user interface panel 113. A type of defect for detection, for example, is selected on the selection screen. The inspection process selection module 202 selects a defect detection process for detecting a defect of the selected type from a plurality of defect detection processes which the image inspection module 205 can execute. The types of defect may include desired types, such as a dot-shaped detect and a stripe-like defect (stripe). In a case where no type of defect is selected by the user, the inspection process selection module 202 selects a defect detection process set by default.

The position matching process module 203 performs a position matching process, described hereinafter with reference to FIG. 7, in which the position matching (i.e. alignment) between the inspection target image and the reference image is performed. The process parameter setting module 204 sets parameters used in the defect detection process selected by the inspection process selection module 202. The parameters include a filter for highlighting a defect of the type selected by the user, and a defect determination threshold value for determining the defect. The image inspection module 205 performs the defect detection process selected by the inspection process selection module 202. The inspection result output module 206 displays results of inspection on the user interface panel 113.

Figure 3:
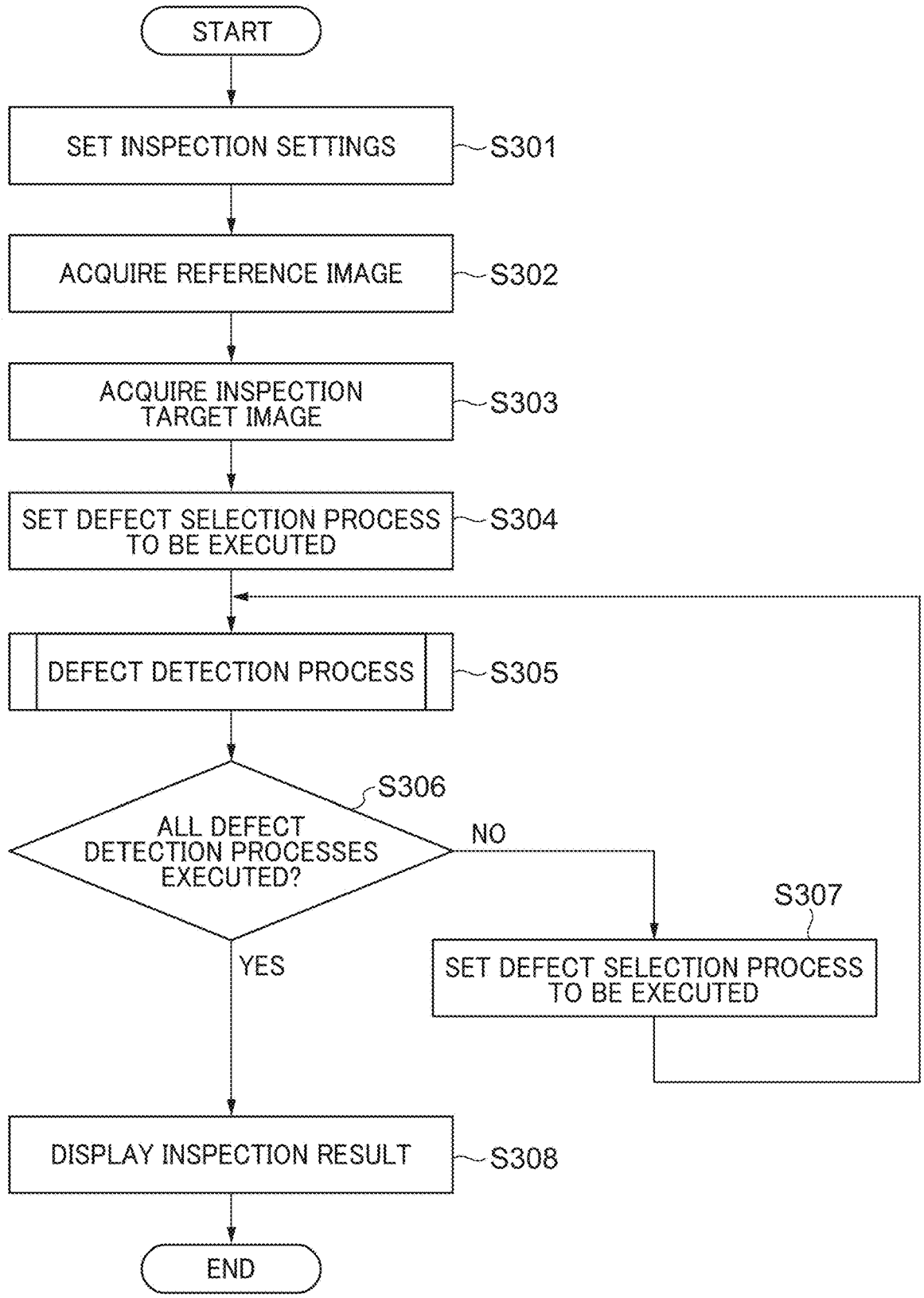
FIG. 3 is a flowchart of an inspection process performed by the inspection apparatus appearing in FIG. 1.

FIG. 3 is a flowchart of an inspection process performed by the inspection apparatus 105 appearing in FIG. 1. The inspection process in FIG. 3 is realized by the CPU 106 that executes a program stored in the ROM 108 by loading the same into the RAM 107.

In FIG. 3, the CPU 106 sets inspection settings necessary for inspection, based on the information input by the user to the user interface panel 113 (step S301). For example, in the step S301, the inspection process selection module 202 selects one or more defect detection processes, based on one or more types of defect, selected by the user. Further, the process parameter setting module 204 sets parameters used in each defect detection process selected by the inspection process selection module 202.

Next, the CPU 106 causes the image acquisition module 201 to acquire the reference image from the RAM 107 or the main storage section 109 (step S302). Next, the CPU 106 causes the image acquisition module 201 to acquire an inspection target image from the image reading section 110 (step S303). Note that in the step S303, the image acquisition 110 may be configured to acquire an inspection target image generated by the image reading section 110 and stored in the main storage section 109 in advance.

Next, the CPU 106 sets one defect selection process to be executed, from the one or more defect detection processes selected by the inspection process selection module 202 (step S304). In the step S304, the CPU 106 sets, for example, a defect detection process registered in advance to be preferentially executed, or a defect detection process associated with a type of defect first selected by the user.

Then, the CPU 106 performs a defect detection process, described hereinafter with reference to FIG. 5 (step S305). Then, the CPU 106 determines whether or not execution of all of the selected defect detection processes has been terminated (step S306).

If it is determined in the step S306 that execution of any of the selected defect detection processes has not been terminated, the CPU 106 sets one defect detection process to be executed, from unexecuted ones of the selected defect detection processes (step S307), and the inspection process returns to the step S305.

Figure 4:
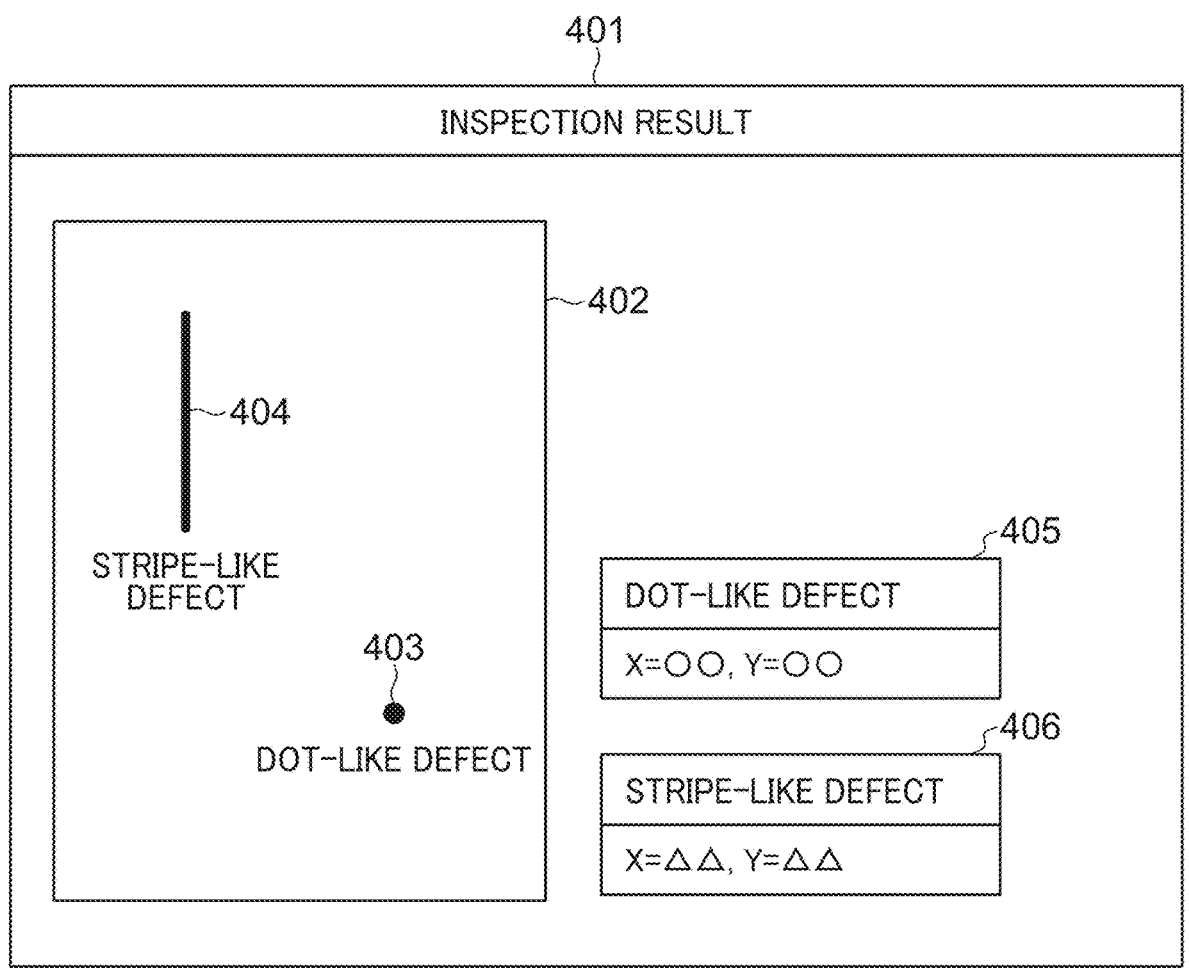
FIG. 4 is a diagram showing an example of a result display screen displayed on a UI panel appearing in FIG. 1.

If it is determined in the step S306 that execution of all of the selected defect detection processes has been terminated, the CPU 106 displays the FIG. 4 result display screen 401 showing results of inspection, on the user interface panel 113 (step S308). The result display screen 401 displays an inspection target image 402. For example, in the vicinity of a defect 403 determined to be a dot-like defect, there are displayed the characters of "dot-like defect". Further, in the vicinity of a defect 404 determined to be a stripe-like defect, there are displayed the characters of "stripe-like defect". Reference numerals 405 and 406 each denote the coordinates of an associated defect in the inspection target image 402. Note that the method of displaying the results of inspection is not limited to the above-described one, but, for example, any suitable method may be employed insofar as it enables the user to recognize which of the plurality of defect detection processes has detected a defect, e.g. by displaying defects with different colors each associated with a different type of defect. After the step S308, the present process is terminated.

Figure 5:
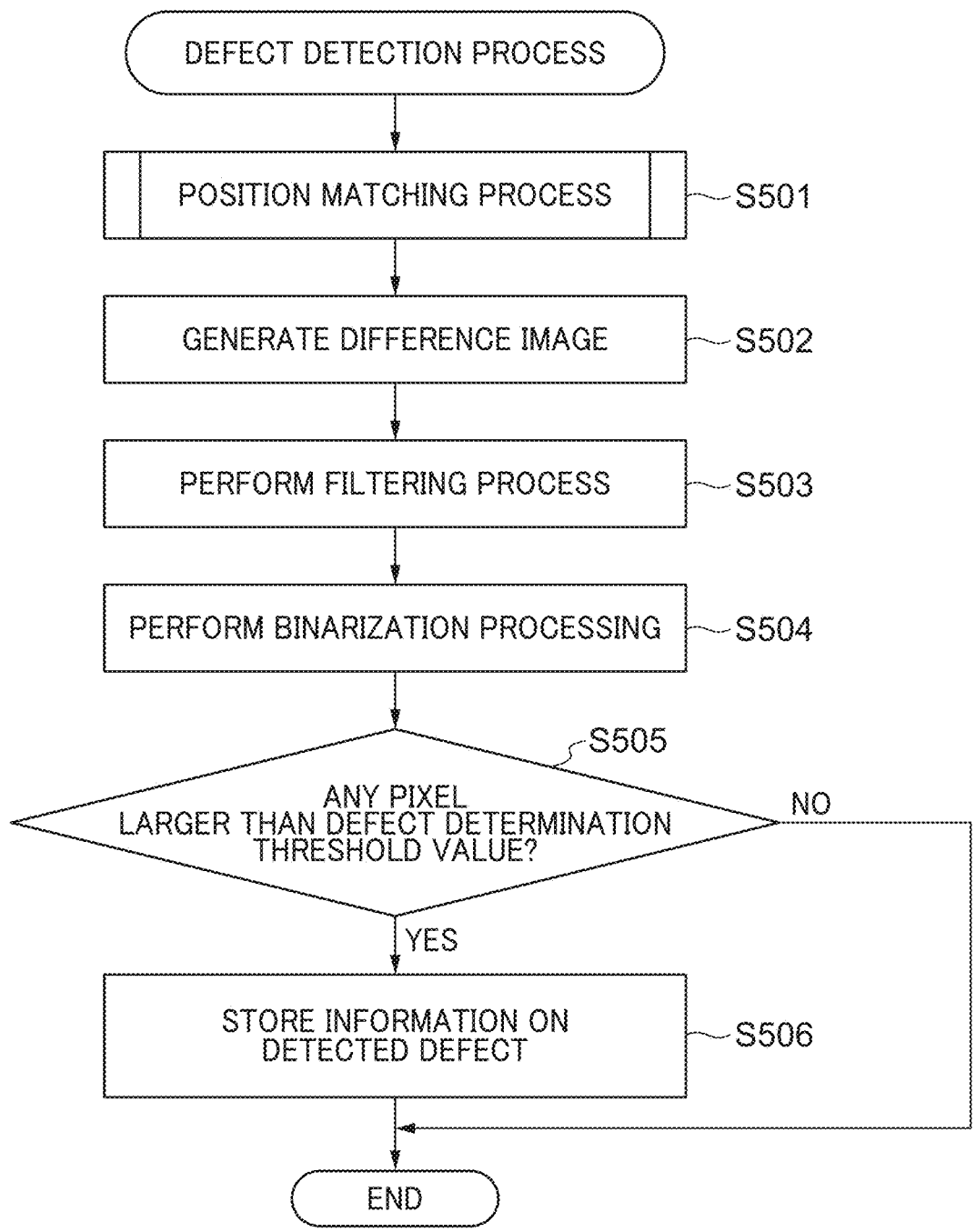
FIG. 5 is a flowchart of a defect detection process in a step in FIG. 3.

FIG. 5 is a flowchart of the defect detection process performed in the step S305 in FIG. 5. Referring to FIG. 5, the CPU 106 causes the position matching process module 203 to execute the position matching process (step S501), described hereinafter with reference to FIG. 7, to thereby perform position matching between an inspection target image and the reference image. Then, the CPU 106 causes the image inspection module 205 to compare between the aligned inspection target image subjected to position matching and the reference image to generate a difference image (step S502). The difference image is, for example, an image generated by comparing between the reference image and the inspection target image, pixel by pixel, and thereby acquiring pixel values, for example, difference values of concentration values in RGB, pixel by pixel.

Figure 6A:
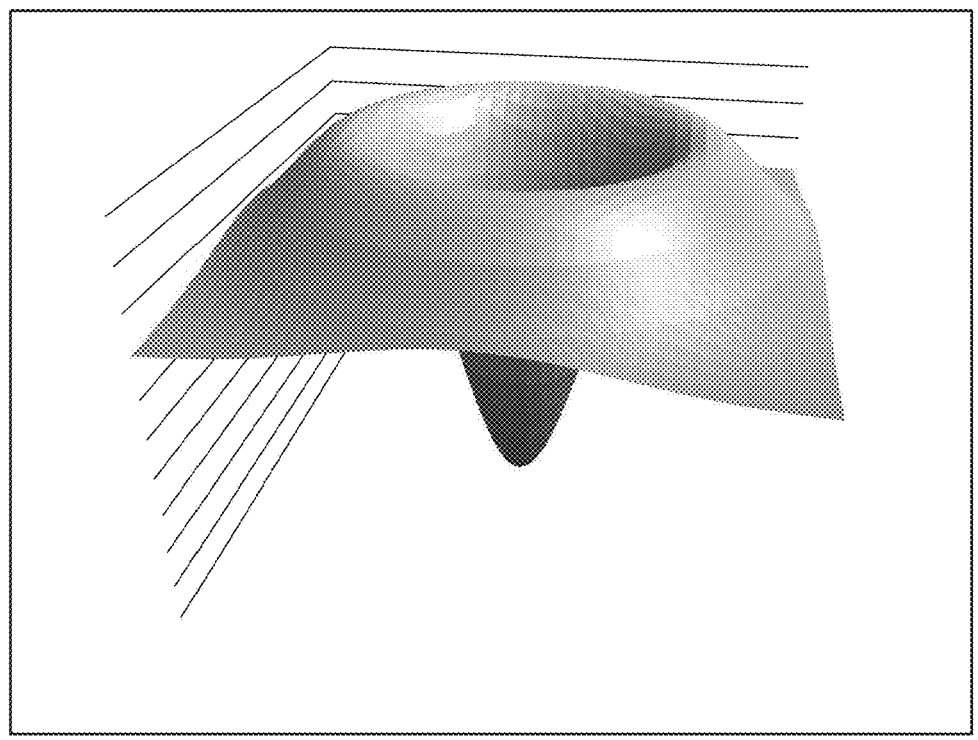
FIGS. 6A and 6B are diagrams showing examples of a filter used in a step in FIG. 5.
Figure 6B:
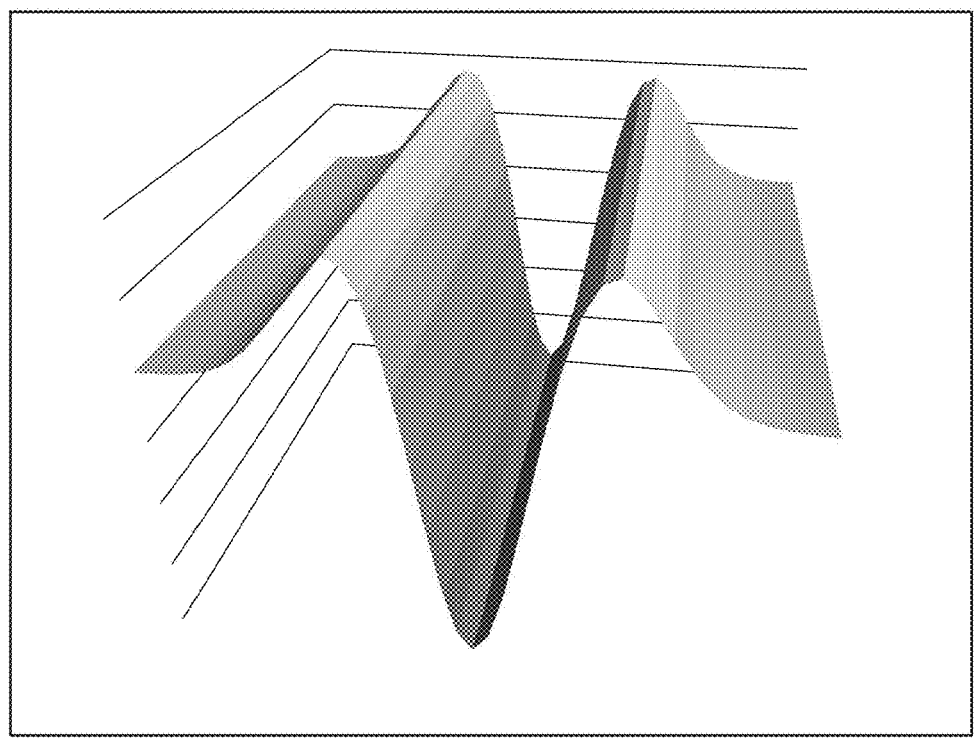

Then, the CPU 106 causes the image inspection module 205 to perform a filtering process for highlighting a specific shape, on the difference image (step S503). For example, FIG. 6A is a filter for highlighting a dot-like defect, while FIG. 6B is a filter for highlighting a stripe-like defect. These filters are changed according to the type of the defect detection process set in the step S304 or the step S307. For example, in a case where the defect detection process set in the step S304 or the step S307 is a defect detection process for detecting a dot-like defect, the filtering process in the step S503 is executed by using the filter shown in FIG. 6A. On the other hand, in a case where the defect detection process set in the step S304 or the step S307 is a defect detection process for detecting a stripe-like defect, the filtering process in the step S503 is executed by using the filter shown in FIG. 6B.

Next, the CPU 106 causes the image inspection module 205 to perform binarization processing on the filtered difference image (step S504). This generates an image (hereafter referred to as "difference binarized image") in which pixels having difference values larger than the defect determination threshold value are set to "1" and pixels having difference values not larger than the defect determination threshold value are set to "0". Next, the CPU 106 causes the image inspection module 205 to determine whether or not there is any pixel larger than the defect determination threshold value, by using the difference binarized value (step S505).

If it is determined in the step S505 that there is no pixel having a difference value larger than the defect determination threshold value, the defect detection process is terminated by determining that the image has no defect. If it is determined in the step S505 that there is a pixel having a difference value larger than the defect determination threshold value, the CPU 106 causes the image inspection module 205 to store information on the detected defect in the RAM 107 and the main storage section 109 (step S506). Specifically, the CPU 106 causes the image inspection module 205 to store a type of the defect detection process which has detected the defect and coordinates of the location of the defect in association with each other in the RAM 107 and the main storage section 109. Then, the defect detection process is terminated.

The defect detection process in FIG. 5 is a subroutine of the step S305, and shows a flow of one defect detection process. Therefore, whenever the subroutine in the step S305 is called, a defect detection process of the selected type is executed. Further, in the step S503, the filtering process is performed by using a filter associated with the defect detection process of the selected type.

In the present embodiment, the defect detection process for detecting a dot-like defect and the defect detection process for detecting a line-shaped detect are described by way of example, the types of the defect detection process are not limited to these. That is, any suitable defect detection process can be applied to the present invention insofar as the defect detection process is capable of detecting types of defect of which detection is desired by a user, and the above description is not intended to limit the types of the defect detection process.

Figure 7:
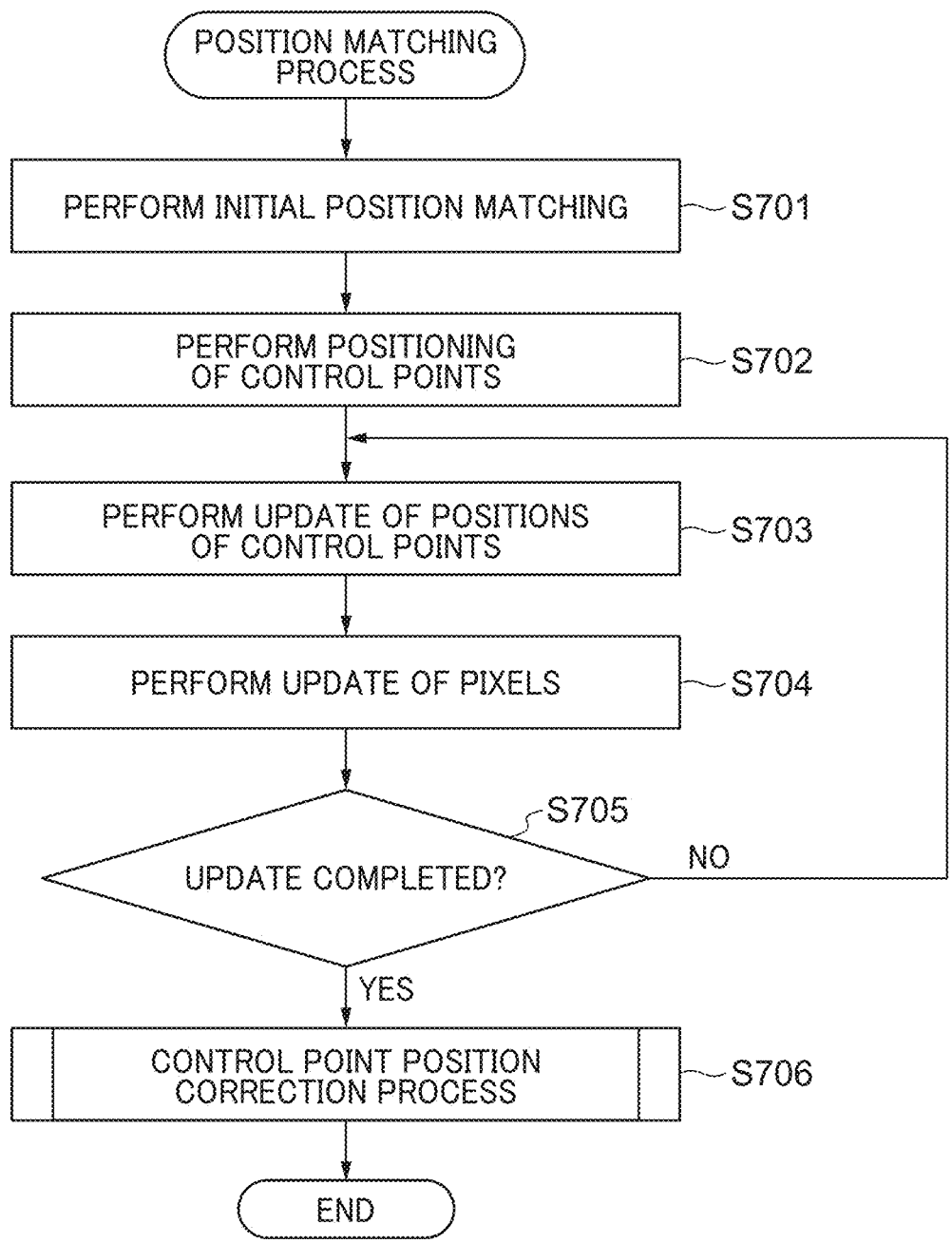
FIG. 7 is a flowchart of a position matching process executed in a step in FIG. 5.

FIG. 7 is a flowchart of the position matching process executed in the step S501 in FIG. 5. Note that in the present embodiment, there is described an example of generation of a position-matched (i.e. aligned) inspection target image (hereinafter referred to as a position-matched image) I' shown in FIG. 8A3 by performing position matching (i.e. aligning) of an inspection targe image I shown in FIG. 8A1 with a reference image T shown in FIG. 8A2. Note that I(x, y), T(x, y) and I'(x, y) show pixel values at respective coordinates (x, y).

Referring to FIG. 7, the position matching process module 203 performs initial position matching (step S701). In the step S701, for example, there is used a method of extracting feature points and performing projection transformation of the feature points such that the total sum of Euclidean distances of the feature points is minimized. Then, the position matching process module 203 performs positioning of control points (step S702) (control point positioning unit). In the step S702, the position matching process module 203 positions a number L×M of control points on an inspection target image I (image on a print product) in a lattice form. Note that the distances δ between the control points are calculated by L, M, and an image size. As shown in FIG. 8B1, coordinates of a control point at an intersection point of an l-th row and an m-th column is each expressed as $p_{l,m}$ (l=1, L, m=1, M).

Next, the position matching process module 203 performs update of the positions of the control points (step S703). An updating formula is shown in the following equation (1). A symbol of µ represents a weighting coefficient, and for example, may have a value of 0.1, and may be changed according to the speed of update of the control points. ∇c is expressed by the following equation (2), and is a differential value of the sum of squares of differences between pixel values of a portion of a position-matched image I' in FIG. 8B3 and pixel values of a corresponding portion of the reference image T in FIG. 8B2, in a set $D_{l,m}$ of the positions of pixels in the vicinity of the control point $p_{l,m}$.

$$p_{l,m} = p_{l,m} + \mu \frac{\nabla c}{\|\nabla c\|} \quad (1)$$

$$\nabla c = \frac{\partial}{\partial p_{l,m}} \sum_{D_{l,m}} |I'(x, y) - T(x, y)|^2 \quad (2)$$

Figure 8C:
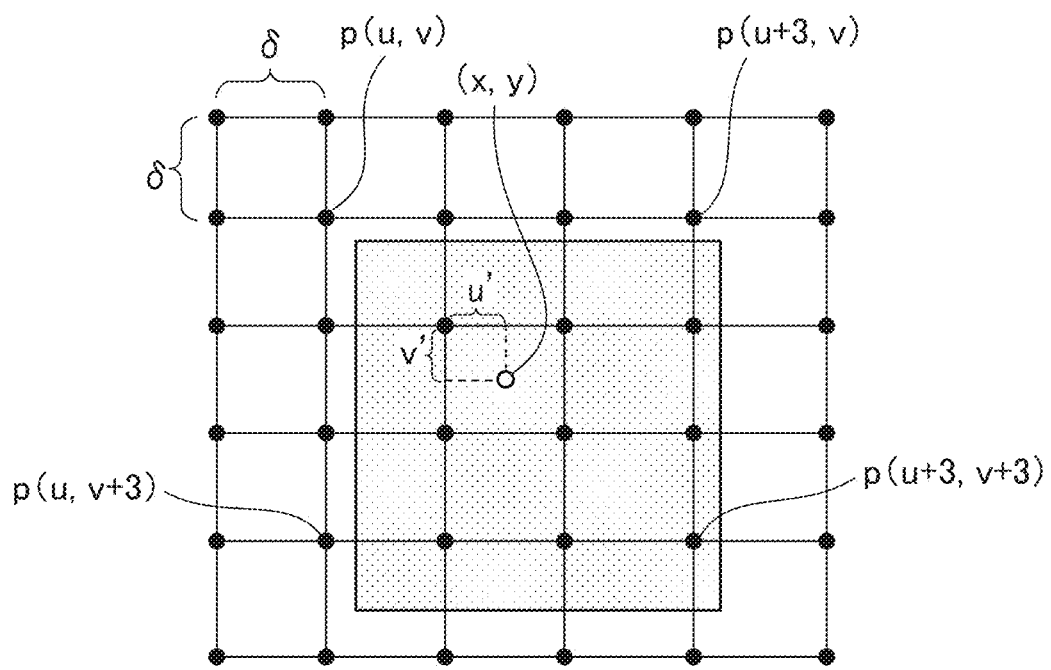

Next, the position matching process module 203 performs update of pixels (step S704). An updating equation is the following equation (3). Coordinates w(x, y) are calculated by the following equation (4) for calculating coordinates (x, y) in an inspection target image I after being subjected to the position matching process. Bases $B_0(t)$, $B_1(t)$, $B_2(t)$, and $B_3(t)$, are expressed by the following equations (5) to (8). Further, symbols u, v, u' and v' appearing in FIG. 8C are expressed by the following equations (9) to (12).

$$I'(x, y) = I(w(x, y)) \quad (3)$$

$$w(x, y) = \sum_{i=0}^{3} \sum_{j=0}^{3} B_i(u') B_j(v') p_{u+i, v+j} \quad (4)$$

$$B_0(t) = (1-t)^3/6 \quad (5)$$

$$B_1(t) = (3t^3 - 6t^2 + 4)/6 \quad (6)$$

$$B_2(t) = (-3t^3 + 3t^2 + 3t + 1)/6 \quad (7)$$

$$B_3(t) = t^3/6 \quad (8)$$

$$u = \lfloor x/\delta \rfloor - 1 \quad (9)$$

$$v = \lfloor y/\delta \rfloor - 1 \quad (10)$$

$$u' = x/\delta - \lfloor x/\delta \rfloor \quad (11)$$

$$v' = y/\delta - \lfloor y/\delta \rfloor \quad (12)$$

Note that although in the present embodiment, the lattice points used for calculating pixel values in the position-matched image I' are set to 16 lattice points of p(u, v), p(u+1, v), . . . , p(u+3, v+3), this is not limitative. For example, there may be used four lattice points which are close in the Euclidean distance of (x,y) between them.

Next, the position matching process module 203 determines whether or not the update of pixels is completed (step S705). In the step S705, for example, the position matching process module 203 determines whether or not the update of pixels is completed, based on a distance d calculated between the position-matched image I' and the reference image T. The distance d is calculated by the following equation (13).

$$d = \frac{1}{XY} \sum_{x=1}^{X} \sum_{y=1}^{Y} |I'(x, y) - T(x, y)| \quad (13)$$

In the step S705, if it is determined that the distance d is not larger than a threshold value set in advance, the position matching process module 203 determines that the update of pixels is completed. On the other hand, if it is determined that the distance d is larger than the threshold value set in advance, the position matching process module 203 determines that the update of pixels is not completed.

If it is determined in the step S705 that the update of pixels is not completed, the position matching process returns to the step S703, whereas if it is determined in the step S705 that the update of pixels is completed, the position matching process module 203 performs a control point position correction process, described hereinafter with reference to FIG. 11, to correct the positions of control points (step S706). Then, the position matching process is terminated.

Next, the control point position correction process executed by the position matching process module 203 in the step S706 will be described.

Figure 9:
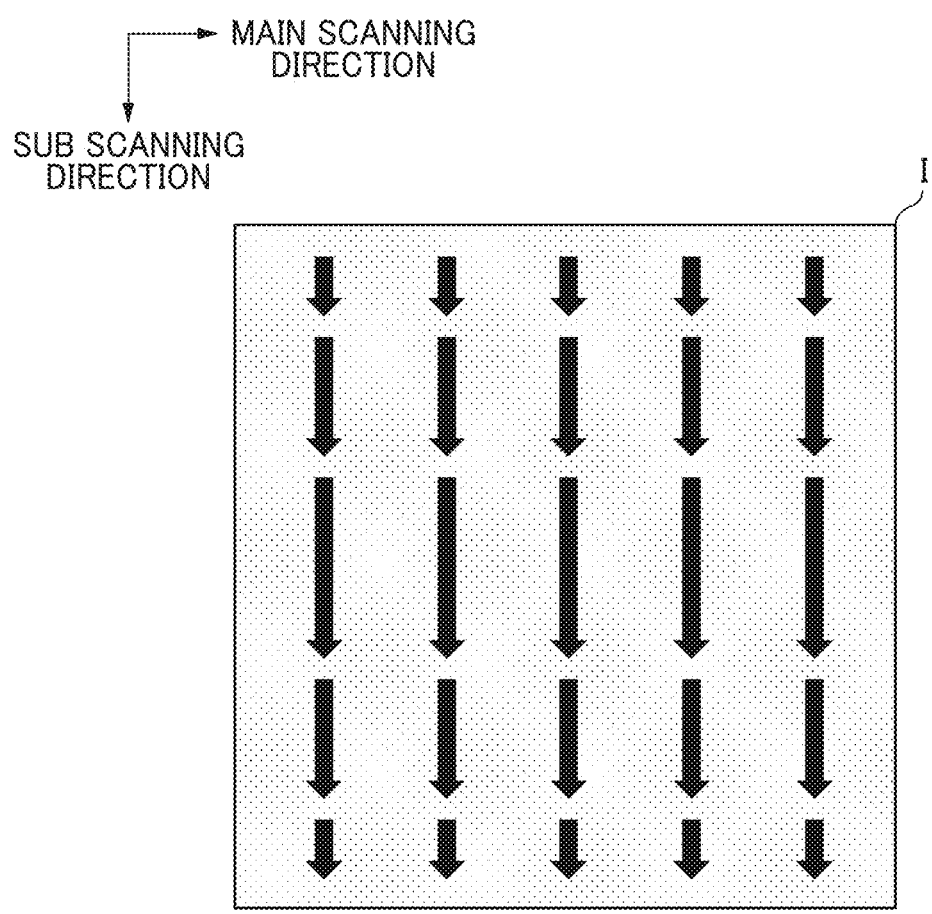
FIG. 9 is a schematic diagram illustrating a direction in which distortion is caused in an inspection target image, with arrows.
Figure 10A:
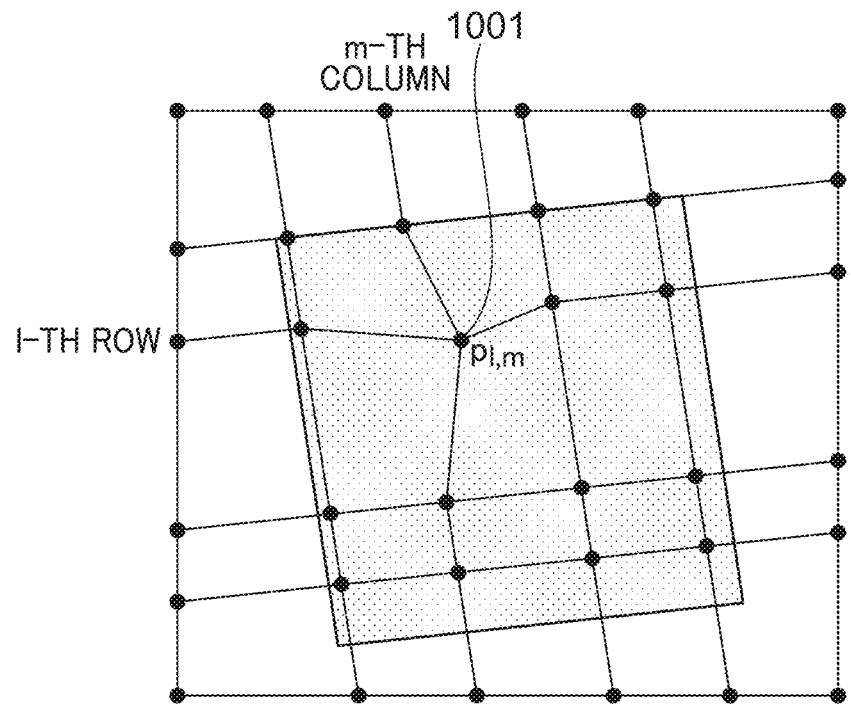
FIGS. 10A and 10B are diagrams useful in explaining correction of positions of control points performed by the first embodiment.
Figure 10B:
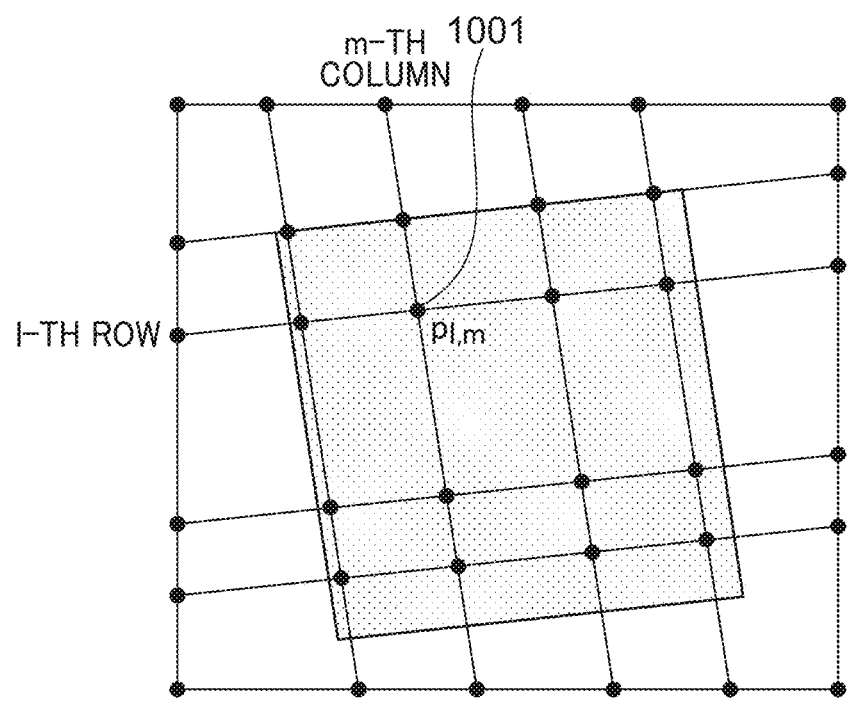

FIG. 9 is a schematic diagram illustrating a direction in which distortion is caused in the inspection target image I, with arrows. Further, FIGS. 10A and 10B are diagrams useful in explaining correction of positions of control points performed in the present embodiment. FIG. 10A is a schematic diagram illustrating an example of the position of a control point immediately after the completion of update of control points in the step S703. FIG. 10B is a schematic diagram illustrating an example of the position of a control point after execution of the control point position correction process in the step S706 in FIG. 7.

In the inspection apparatus 105, when an inspection target image I is generated by the image reading section 110 that reads a print product delivered as an inspection target from the printing apparatus 102, the inspection target image I is uniformly distorted in a sub scanning direction as shown in FIG. 9. This is caused because the sheet conveyance speed is not constant. Further, although the inspection target image is sometimes distorted in a skewed direction by the sheet being conveyed in the skewed direction, the tendency of distortion of the sheet in the sub scanning direction does not change. For the reason described above, the direction of distortion linearly changed on the sheet surface, and hence, by executing the update of control points in the step S703, the control points are linearly positioned. Therefore, a locally displayed control point as in a point 1001 appearing in FIG. 10A is not to be inherently generated. However, in a case where a defect of color similar to that in the picture exists in the vicinity of a picture in the inspection target image I, the update of control points in the step S703 causes the defect to be processed as part of the picture to update the position of the control points. As a result, the control point in the vicinity of the defect is displaced to an unexpected position, whereby in the position-matched picture I', there arises the problem of lowering of the position matching accuracy, including sinking of the defect into the picture.

In contrast, in the present embodiment, based on a plurality of control points positioned in the same column as one control point, an approximate straight line of the column is calculated, and based on a plurality of control points positioned in the same row as the one control point, an approximate straight line of the row that intersects the approximate straight line of the column is calculated. Based on the approximate straight line of the column and the approximate straight line of the row, the position of the one control point is corrected.

Figure 11:
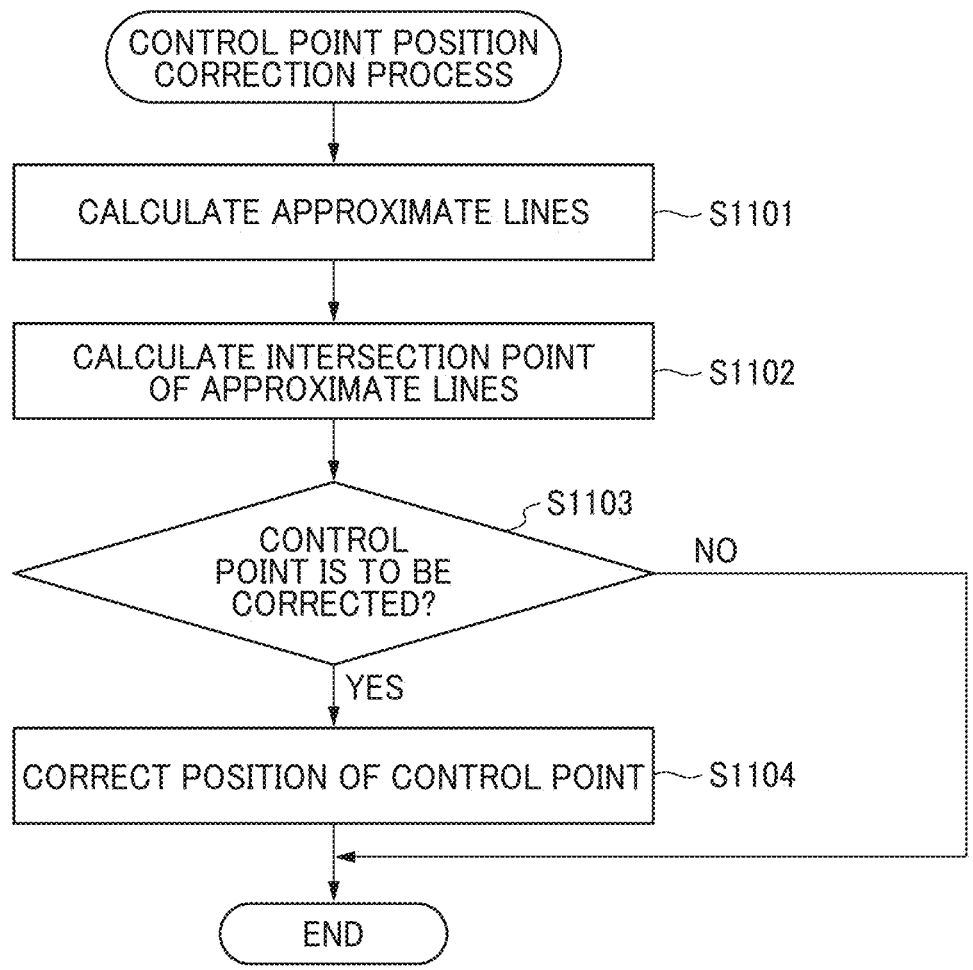
FIG. 11 is a flowchart of a control point position correction process in a step in FIG. 7.
Figure 12:
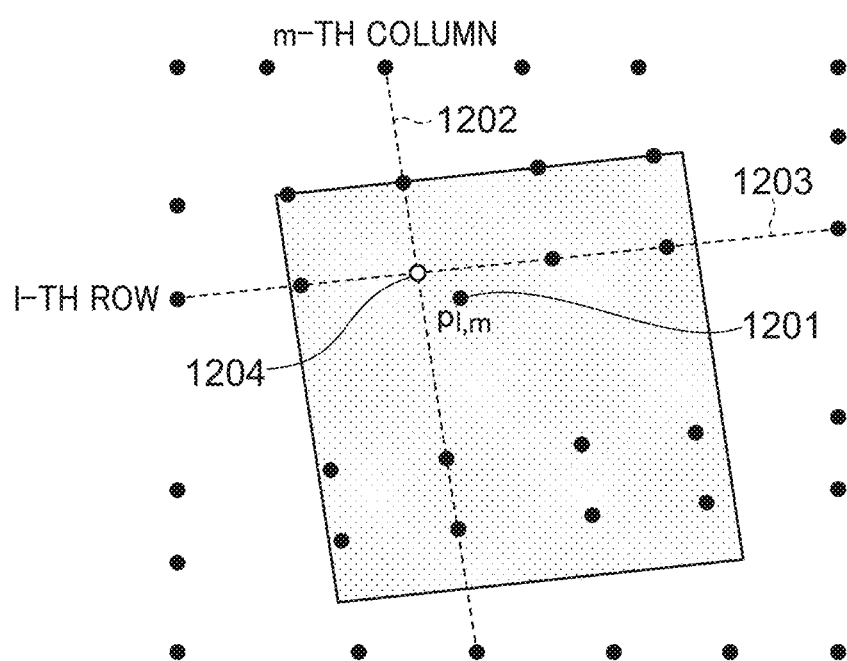
FIG. 12 is a flowchart useful in explaining calculation of an approximate straight line in a step in FIG. 11.

FIG. 11 is a flowchart of a control point position correction process in the step S706 in FIG. 7. Note that the control point position correction process in FIG. 11 is performed on all positioned control points. The following description is given of a case where the control point position correction process is performed on a control point 1201 of L×M positioned control points appearing in FIG. 12, by way of example. Note that the control point 1201 is a control point at an intersection point of the l-th row and the m-th column.

Referring to FIG. 11, the position matching process module 203 calculates an approximate straight line using the control point 1201 (step S1101) (operation of an approximate straight line calculation unit). Specifically, the position matching process module 203 calculates an approximate straight line 1202 appearing in FIG. 12 (approximate straight line of a column) based on a plurality of control points positioned in the same column as the control point 1201, i.e. in the m-th column. Further, the position matching process module 203 calculates an approximate straight line 1203 appearing in FIG. 12 (approximate straight line of a row) based on a plurality of control points positioned in the same row as the control point 1201, i.e. in the l-th row. In the step S1101, the approximate straight line is determined by a method using a regression line of the positions of the control points. For example, in the approximate straight line 1202, the regression line for predicting a y coordinate from an x coordinate is calculated by using all control points included in the m-th column.

Next, the position matching process module 203 calculates an intersection point 1204 of the approximate straight line 1202 and the approximate straight line 1203 (step S1102). Then, the position matching process module 203 calculates a distance from the control point 1201 to the intersection point 1204. The position matching process module 203 determines based on the calculated distance whether or not the control point 1201 is to be corrected (step S1103). In the step S1103, in a case where the calculated distance is larger than a predetermined value, the position matching process module 203 determines that the control point 1201 is to be corrected. On the other hand, in a case where the calculated distance is not larger than the predetermined value, the position matching process module 203 determines that the control point 1201 is not to be corrected.

If it is determined in the step S1103 that the control point 1201 is not to be corrected, the position matching process module 203 terminates the present process. If it is determined in the step S1103 that the control point 1201 is to be corrected, the position matching process module 203 corrects the position of the control point 1201 to the position of the intersection point 1204 calculated in the step S1102 (step S1104), followed by terminating the present process.

According to the present embodiment described above, based on a plurality of control points positioned in the same column as the control point 1201, the approximate straight line 1202 is calculated, and the approximate straight line 1203 intersecting the approximate straight line 1202 is calculated based on the plurality of control points positioned in the same row as the control point 1201. Based on the approximate straight line 1202 and the approximate straight line 1203, the position of the control point 1201 is corrected. With this, when the position of the control point 1201 in the vicinity of the picture is updated to an unexpected position due to the defect of existence of a similar color to that of the picture in the inspection target image, the position of the control point 1201 can be corrected to a proper position using the appropriate straight line 1202 and the approximate straight line 1203. As a result, it is possible to prevent lowering of the position matching accuracy.

Further, in the embodiment described above, in a case where the distance from the intersection point 1204 of the approximate straight line 1202 and the approximate straight line 1203 to the control point 1201 is larger than the predetermined value, the position of the control point 1201 is corrected to the position of the intersection point 1204. With this, it is possible to correct the position of the control point 1201 such that the position of the control point 1201 is on the line of the control points positioned in the same row as the control point 1201 and on the line of the control points positioned in the same column as the control point 1201.

Although in the embodiment described above, in the control point position correction process, the approximate straight line is used, but instead of the approximate straight line, an approximate curved line may be used. Further, although the above description is given of a linear change in the distortion of the inspection target image on the sheet surface, in a case where the size of the sheet is large, distortion sometimes changes in a curved manner due to progressive skewing of a sheet during printing or reading. In a case where the distortion thus changes in a curved manner, even if the approximate straight line is used as described above, it is impossible to properly correct the position of the control point.

Figure 13:
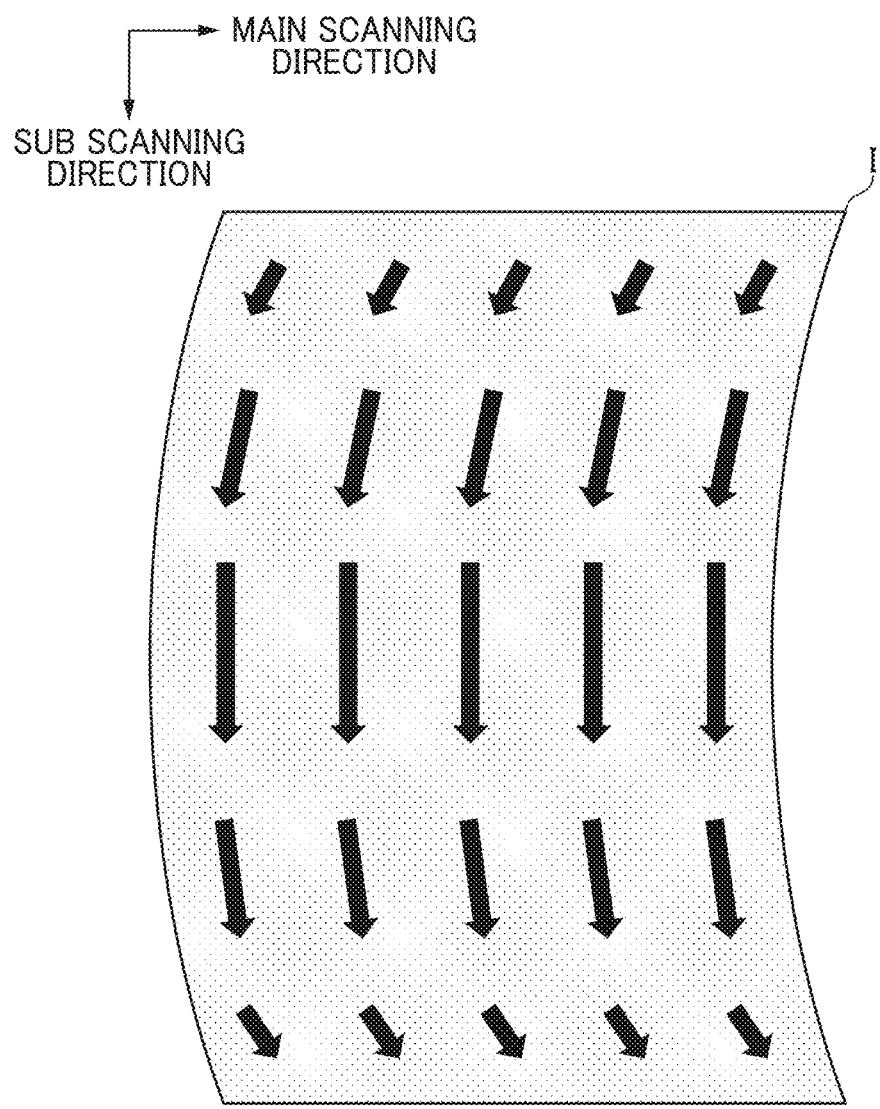
FIG. 13 is a schematic diagram illustrating a direction in which distortion is caused in an inspection target image generated by reading a print product having a large size, with arrows.

FIG. 13 is a schematic diagram illustrating a direction in which distortion is caused in an inspection target image generated by reading a print product having a large size, with arrows. FIG. 13 shows curved changes in the direction of distortion on the sheet surface. In the case of reading a print product having a large sheet size, reading is subject to unevenness of sheet conveyance, causing changes in distortion in a curved manner due to progressive skewing of the sheet.

In the present embodiment, in inspecting a print product having a large sheet size, approximate curved lines are calculated by the control point position correction process, and the positions of control points are corrected using the approximate curved lines.

Figure 14:
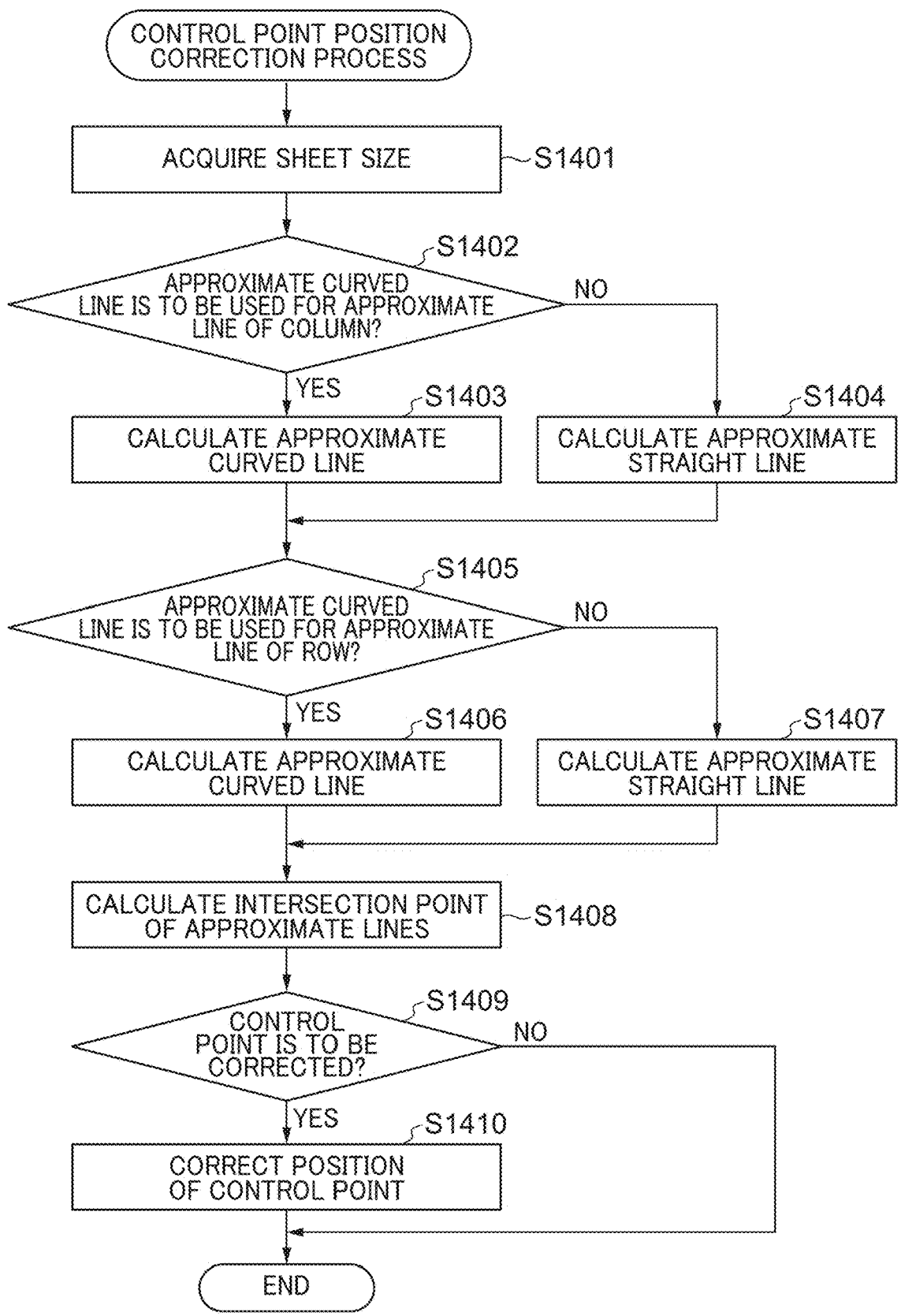
FIG. 14 is a flowchart of a variation of the control point position correction process in the step in FIG. 7.

FIG. 14 is a flowchart of a variation of the control point position correction process in the step S706 in FIG. 7. Note that the control point position correction process in FIG. 14 is similar to the control point position correction process in FIG. 11, and the following description is given of different points from the control point position correction process in FIG. 11. Further, similar to the control point position correction process in FIG. 11, the control point position correction process in FIG. 14 is performed on all positioned control points. The following description is given of a case where the control point position correction process is performed on a control point 1501 of L×M positioned control points appearing in FIG. 15, by way of example. Note that the control point 1501 is a control point at an intersection point of the l-th row and the m-th column.

Referring to FIG. 14, the position matching process module 203 acquires the sheet size of a print product as an inspection target (step S1401). In the step S1401, the inspection apparatus 105 acquires the above-mentioned sheet size from the printing apparatus 102 having delivered the print product as an inspection target or the server 101 from which print job data for printing the print product has been transmitted to the printing apparatus 102.

Next the position matching process module 203 determines based on the acquired sheet size whether or not an approximate curved line is to be used for the approximate line of a column (step S1402). In the step S1402, in a case where the length of sides of the print product extending in a main scanning direction is equal to or larger than a predetermined length, the position matching process module 203 determines that the approximate curved line is to be used for an approximate line of a column. On the other hand, in a case where the length of sides of the print product extending in the main scanning direction is smaller than the predetermined length, the position matching process module 203 determines that the approximate curved line is not to be used for the approximate line of a column. Note that the predetermined length may be set in advance, and may be configured to be changeable by a user according to the characteristics and use environment of the printing apparatus 105.

If it is determined in the step S1402 that the approximate curved line is to be used for the approximate line of a column, the position matching process module 203 calculates the approximate curved line using the control point 1501 (step S1403). Specifically, the position matching process module 203 calculates an approximate curved line 1502 in FIG. 15, based on a plurality of control points positioned in the same column as the control point 1501, i.e. in the m-th column. In the step S1403, the approximate curved line is determined by a method using the regression curve of the positions of the control points. For example, in the approximate curved line 1502, the regression curve for predicting a y coordinate from an x coordinate is calculated by using all control points included in the m-th column. Then, the control point position correction process proceeds to a step S1405, described hereinafter.

If it is determined in the step S1402 that the approximate curved line is not to be used for the approximate line of the column, the position matching process module 203 calculates the approximate straight line based on a plurality of control points positioned in the same column as the control point 1501, i.e. in the m-th column (step S1404). Note that the method of determining the approximate straight line is the same as in the step S1101 in FIG. 11. Next, the position matching process module 203 determines based on the acquired sheet size whether or not the approximate curved line is to be used for the approximate line of a row (step S1405). In the step S1405, it is determined whether or not the length of sides of the sheet in the sub scanning direction is equal to or larger than a predetermined length. If it is determined in the step S1405 that the length of sides of the sheet in the sub scanning direction is equal to or larger than the predetermined length, the position matching process module 203 determines that the approximate curved line is to be used for the approximate line of a row. On the other hand, if it is determined in the step S1405 that the length of sides of the sheet in the sub scanning direction is smaller than the predetermined length, the position matching process module 203 determines that the approximate curved line is not to be used for the approximate line of a row.

If it is determined in the step S1405 that the approximate curved line is to be used for the approximate line of a row, the position matching process module 203 calculates the approximate curved line by using the control point 1501 (step S1406). Specifically, the position matching process module 203 calculates an approximate curved line 1503 appearing in FIG. 15 based on a plurality of control points positioned in the same row as the control point 1501, i.e. in the l-th row. Note that similar to the step S1403, the approximate curved line is calculated by the method using the regression curve of the positions of the control points. Next, the control point position correction process proceeds to a step S1408, described hereinafter.

If it is determined in the step S1405 that the approximate curved line is not to be used for the approximate line of a row, the position matching process module 203 calculates an approximate straight line based on a plurality of control points positioned in the same row as the control point 1501, i.e. in the l-th row (step S1407). Thus, in this variation, based on the sheet size of a print product as an inspection target, it is determined which of the approximate straight line and the approximate curved line is to be used for the approximate line of a column and the approximate line of a row.

For example, in a case where the length of sides of a print product in the main scanning direction and the length of sides of the same in the sub scanning direction are both equal to or larger than respective associated predetermined lengths, as in the case of roll paper, there is a possibility that the print product meanders during conveyance of the print product, which causes distortion to be changed in a curved manner in all of the sides. For correction of the positions of control points in inspection of a print product having such a sheet size, the approximate curved line is used for both of the approximate line of a column and the approximate line of a row.

Further, in a case where the length of sides of a print product in the main scanning direction is equal to or larger than an associated predetermined length and the length of sides of the same in the sub scanning direction is smaller than an associated predetermined length, as in the case of A3 paper, distortion is changed in a curved manner only in the sides in the main scanning direction. For correction of the positions of control points in inspection of a print product having such a sheet size, the approximate curved line is used for the approximate line of a column and the approximate straight line is used for the approximate line of a row.

Further, in a case where the length of sides of a print product in the main scanning direction is smaller than the associated predetermined length and the length of sides of the same in the sub scanning direction is equal to or larger than the associated predetermined length, as in the case of A3R paper, distortion is changed in a curved manner only in the sides in the sub scanning direction. For correction of the positions of control points in inspection of a print product having such a sheet size, the approximate straight line is used for the approximate line of a column and the approximate curved line is used for the approximate line of a row.

Further, in a case where the length of sides of a print product in the main scanning direction and the length of sides of the same in the sub scanning direction are both smaller than the respective predetermined lengths as in the case of A4 paper, distortion is not changed in a curved manner in any of the sides. For correction of the positions of control points in inspection of a print product having such a sheet size, the approximate straight line is used for both of the approximate line of a column and the approximate line of a row.

Figure 15:
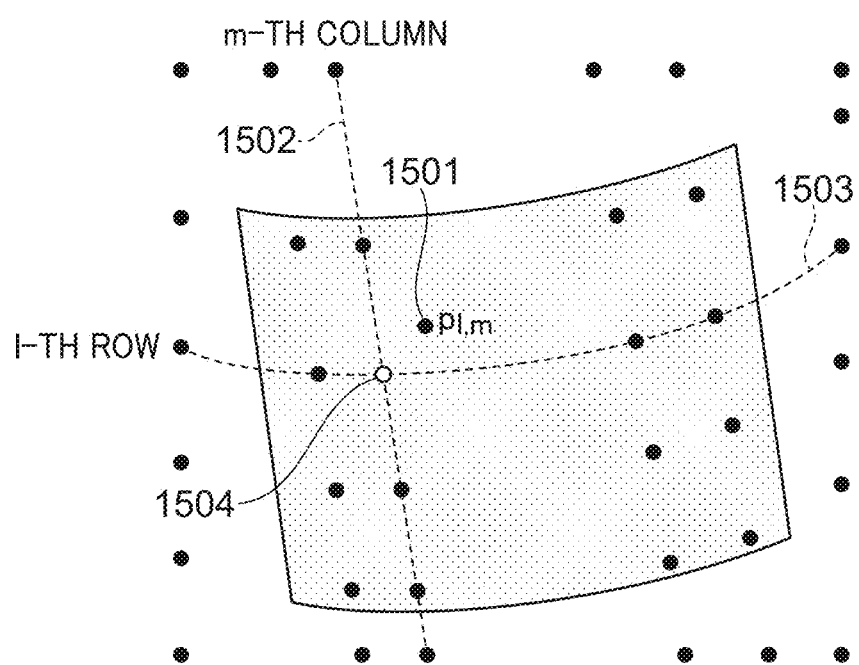
FIG. 15 is a diagram useful in explaining calculation of an approximate curved line in a step in FIG. 14.
Figure 16A:
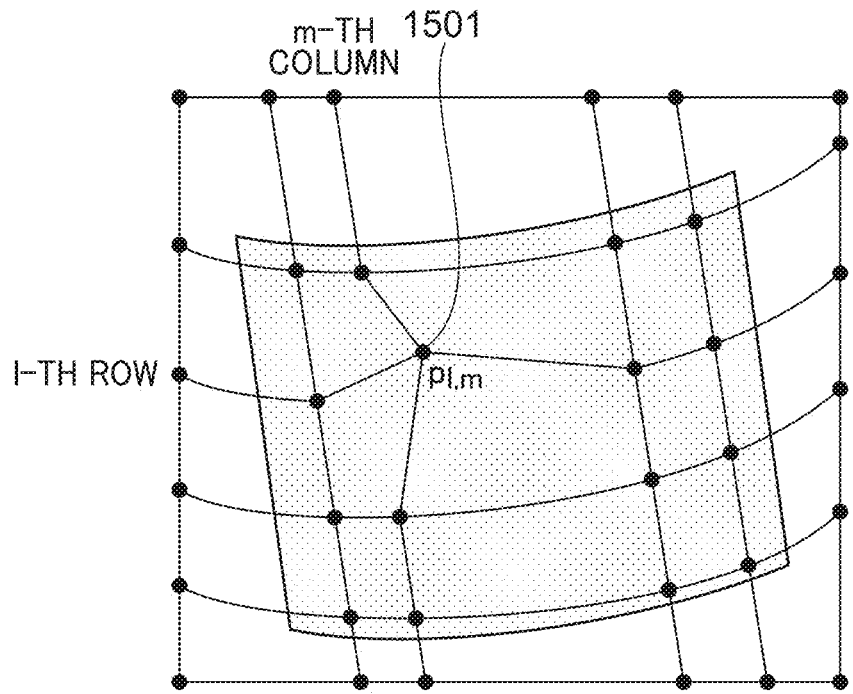
FIGS. 16A and 16B are diagrams useful in explaining correction of positions of control points performed by the control point position correction process in FIG. 14.
Figure 16B:
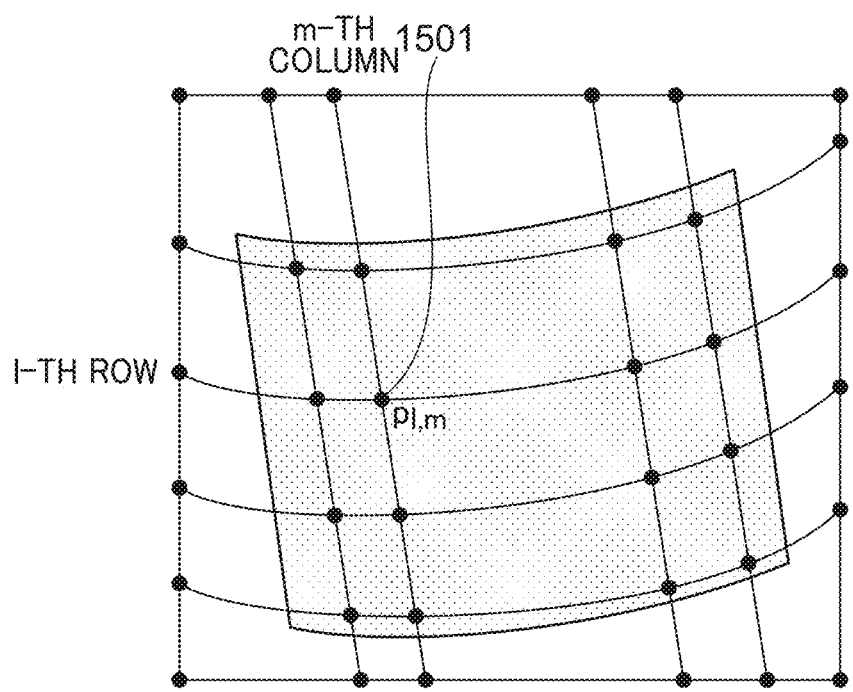

Then, the position matching process module 203 calculates an intersection point of the approximate line calculated in the step S1403 or in the step S1404 and the approximate line calculated in the step S1406 or in the step S1407, for example, an intersection point 1504 appearing in FIG. 15 (step S1408). Next, the position matching process module 203 executes a step S1409 and a step S1410 similar to the steps S1103 and S1104. With this, the position of the control point 1501 updated to an unexpected position in the step S703 (see e.g. FIG. 16A) due to existence of similar color to that of a picture in the inspection target image I, in the vicinity of the picture, is corrected as shown in FIG. 16B. After termination of the processing in the step S1410, the position matching process module 203 terminates the present process.

In the variation described above, based on the sheet size of a print product as an inspection target, which of the approximate straight line and the approximate curved line is to be used is determined. With this, for a configuration in which whether the distortion has a straight characteristic or a curved characteristic changes depending on each sheet size of a print product, it is possible to correct the positions of control points according to the sheet size of the print product.

Further, in the variation described above, in a case where the length of sides of a print product in the main scanning direction and the length of sides of the same in the sub scanning direction are both equal to or larger than the respective associated predetermined lengths, the approximate curved line is used for both of the approximate line of a column and the approximate line of a row. With this, for inspection of a print product with a sheet size of which both the length of sides in the main scanning direction and the length of sides in the sub scanning direction are relatively long and hence which has a possibility of meandering during conveyance thereof, it is possible to prevent lowering of position matching accuracy.

In the variation described above, in a case where the length of sides of a print product in the main scanning direction is equal to or larger than the associated predetermined length and the length of sides of the same in the sub scanning direction is smaller than the associated predetermined length, the approximate curved line is used for the approximate line of a column and the approximate straight line is used for the approximate line of a row. With this, it is possible to prevent lowering of position matching accuracy in inspecting a print product having a sheet size in which the length of sides in the main scanning direction is relatively long.

In the variation described above, in a case where the length of sides of a print product in the main scanning direction is smaller than the associated predetermined length and the length of sides of the same in the sub scanning direction is equal to or larger than the associated predetermined length, the approximate straight line is used for the approximate line of a column and the approximate curved line is used for the approximate line of a row. With this, it is possible to prevent lowering of position matching accuracy in inspecting a print product having a sheet size in which the length of sides in the sub scanning direction is relatively long.

In the variation described above, in a case where the length of sides of a print product in the main scanning direction and the length of sides of the same in the sub scanning direction are both smaller than the respective associated predetermined lengths, the approximate straight line is used for both of the approximate line of a column and the approximate line of a row. With this, for inspection of a print product with a sheet size of which both the length of sides in the main scanning direction and the length of sides in the sub scanning direction are relatively short and hence which does not cause curved changes in distortion in any of the sides, it is possible to prevent lowering of position matching accuracy.

Next, a second embodiment of the present invention will be described. Although in the above-described embodiment and variation, the case is described in which all control points are used for calculating approximate lines, the control points sometimes include ones which should not be used for calculating approximate lines. Let us consider a case where an area around a control point is sold colored or blank. In such an area around a control point, the difference between a reference image and an inspection target image is uniform. The amount of update of the control point is calculated based on a gradient of the difference between the reference image and the inspection target image, as will be understood from the equations (1) and (2). Therefore, in an area where the difference is uniform, even if distortion is actually caused in the area where the difference is uniform, an amount of update close to zero is calculated. As a result, control points moved along the distortion and control points hardly moved mixedly exist, and by using both of these control points for calculation of approximate lines, approximate lines shifted from ideal positions are calculated.

In the second embodiment, in inspection of a print product including a solid-colored or blank area where the color of areas around control points does not vary, the description will be given of a method of calculating appropriate approximate lines by selecting control points which are reliable in calculating approximate lines. Note that the hardware configuration of an inspection system including an inspection apparatus according to a second embodiment of the present invention is the same as that of the inspection system according to the first embodiment. Further, the software configuration of the inspection apparatus according to the second embodiment is also the same as that of the inspection apparatus according to the first embodiment, except different points described hereafter.

Figure 17:
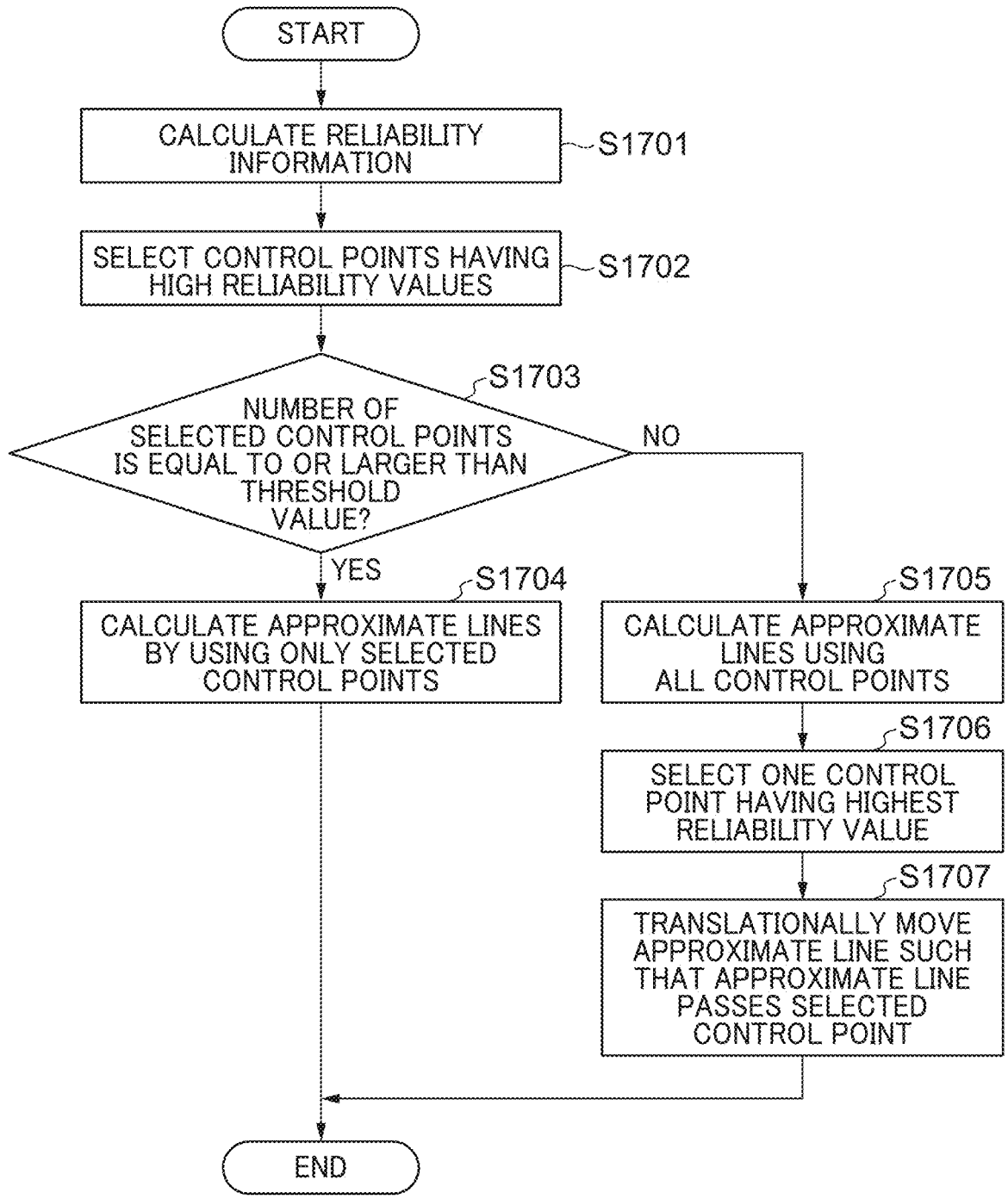
FIG. 17 is a flowchart of a variation of a process for calculating an approximate straight line, which is executed in a step in FIG. 11, or a process for calculating an approximate straight line, which is executed in a step in FIG. 14, the variation being performed by an inspection apparatus according to a second embodiment of the present invention.

FIG. 17 is a flowchart of a variation of the approximate line calculation process in the step S1101 in FIG. 11, the approximate curved line calculation process in the steps S1403 and S1406 in FIG. 14, and the approximate straight line calculation process in the steps S1404 and S1407 in FIG. 14. Note that the approximate line calculation process in FIG. 17 is performed on all positioned control points. The following description is given of a case where the approximate line calculation process in FIG. 17 is performed on a control point 1801 of L×M positioned control points appearing in FIG. 18. Note that in FIG. 18, the control point 1801 is at an intersection point of the l-th row and the m-th column, and a picture 1805 is printed on a print product.

Figure 18:
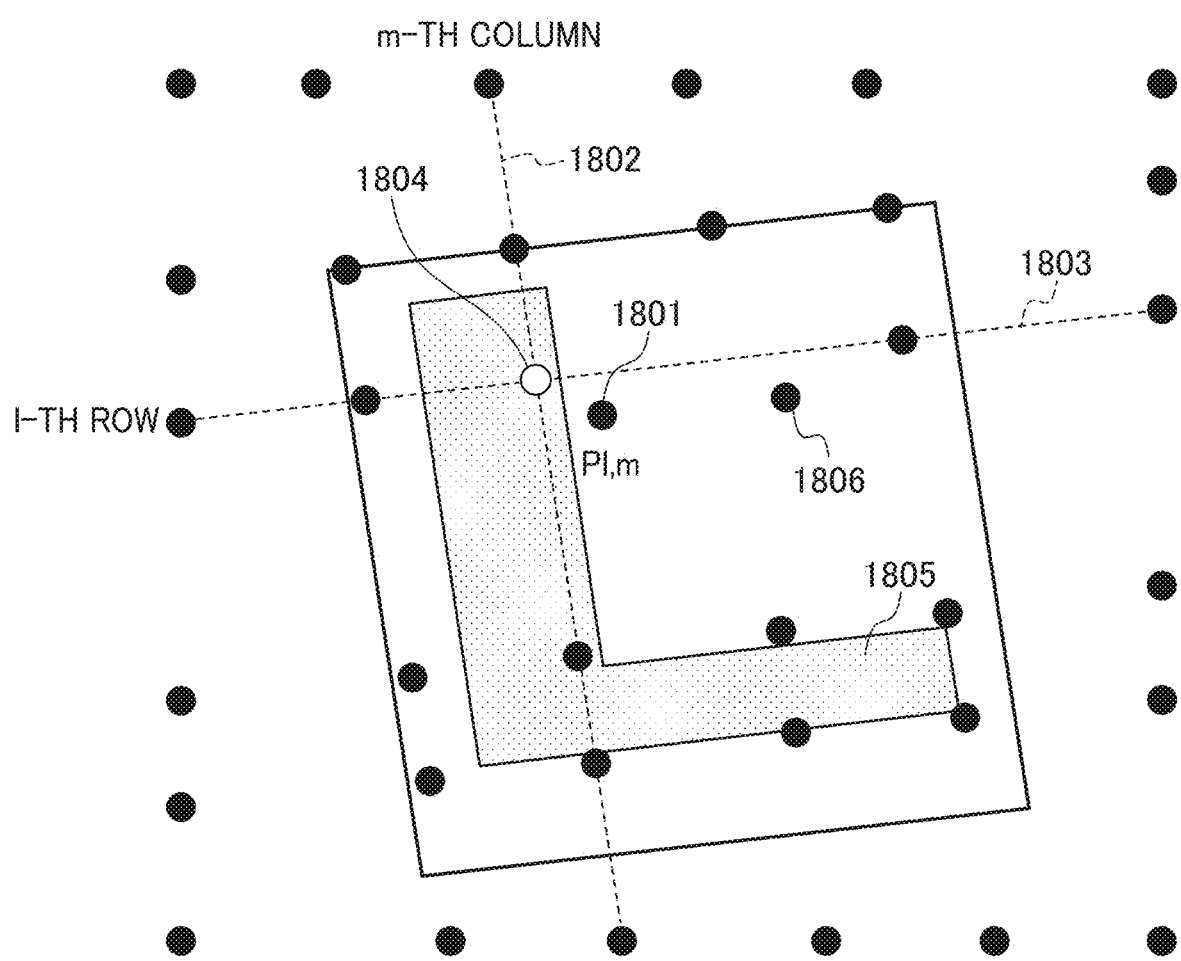
FIG. 18 is a diagram useful in explaining correction of positions of control points performed by the control point position correction process.

In the step S1701, the position matching process module 203 generates reliability information (reliability values) for all control points. The reliability values are calculated by a method of generating an edge image by applying an edge extraction filter to the reference image and calculating an average value of edge intensity values around a control point as a reliability value. For example, a control point 1806 in FIG. 18 is in a solid-colored or blank area where there is no object to be drawn by the printing apparatus 102, and hence a low reliability value is calculated.

In a step S1702, the position matching process module 203 selects, from control points positioned in a m-th column, ones having a reliability value equal to or higher than a threshold value, for calculating an approximate line of a column, and the others having a reliability value lower than the threshold value are not used for calculating the approximate line of the column. Further, the position matching process module 203 selects, from control points positioned in an l-th row, ones having a reliability value equal to or higher than the threshold value, for calculating an approximate line of a row, and the others having a reliability value lower than the threshold value are not used for calculating the approximate line of the row. For example, the control point 1806 has a low reliability value, it is not selected for calculating an approximate line 1803 of a row.

In the step S1702, in a case where the number of selected control points is very small, it is sometimes impossible to calculate an appropriate approximate line. To overcome this problem, in a step S1703, the position matching process module 203 determines whether or not the number of control points selected from the m-th column (or the l-th row) is equal to or larger than a threshold value. If it is determined that the number of the selected control points is equal to or larger than the threshold value, an approximate line is calculated using only the selected control points (step S1704). Specifically, an approximate line 1802 in FIG. 18 (approximate line of a column) is calculated based on the control points selected from the m-th column. Further, the approximate line 1803 in FIG. 18 (approximate line of a row) is calculated based on the control points selected from the l-th row.

On the other hand, in a case where the number of the selected control points is smaller than the threshold value, there is performed the following process: First, an approximate line is calculated using all the control points in the column (or row) (step S1705). Next, one control point having the highest reliability value of the column (or the row) is determined (step S1706). Then, the calculated approximate line is translationally moved such that the approximate line passes the one control point and thereby finally determine this line as the approximate line of the column (or the row) (step S1707).

Based on the the approximate line 1802 of the column and the approximate line 1803 of the row, an intersection point 1804 is calculated in the step S1102 or the step S1408.

In the second embodiment described above, in a case where an area around a control point is a solid-colored or blank area with no variation of colors, the control point is not used for calculating an approximate line, whereby it is possible to calculate an approximate line which is close to an ideal position. With this, in inspection of a print product including a solid-colored or blank area, it is possible to improve the accuracy of the correction process, and thereby prevent lowering of position matching accuracy.

The present invention may be applied to a system comprised of a plurality of device and apparatuses, for example, a host computer, an interface device, a reader, and a printer. Further, the present invention may be applied to units each formed by a single apparatus, for example, a multifunction peripheral and a facsimile apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138952, filed Aug. 27, 2021 and Japanese Patent Application No. 2022-124219, filed Aug. 3, 2022, which are hereby incorporated by reference herein in its entirety.

What is claimed is:

1. An inspection apparatus that inspects, based on a reference image registered in advance, whether there is a defect in a print product, comprising:
   at least one processor; and
   a memory coupled to the at least one processor, the memory having instructions that, when executed by the processor, perform the operations as:
   a control point positioning unit configured to position a plurality of control points in a lattice form on a scanned image of the print product generated by reading the print product, for performing position matching between the scanned image and the reference image;
   an update unit configured to update positions of the plurality of control points;
   an approximate line calculation unit configured to calculate an approximate line of a column based on two or more control points positioned in a same column as one control point of the plurality of control points, and an approximate line of a row intersecting the approximate line of the column based on two or more control points positioned in a same row as the one control point;
   a determination unit configured to determine whether or not the one control point is to be corrected;
   a correction unit configured to correct the position of the one control point that is determined to be corrected by the determination unit, based on the approximate line of the column and the approximate line of the row; and
   an inspection process unit configured to inspect whether there is a defect in the print product, by comparing a position-matched scanned image generated based on the plurality of control points including control points of which positions have been corrected by the correction unit and control points of which positions have been updated by the update unit, and the reference image.

2. The inspection apparatus according to claim 1, wherein the determination unit determines, in a case where a distance from an intersection point of the approximate line of the column and the approximate line of the row to the one control point is larger than a predetermined value, that the one control point is to be corrected, and
   wherein the correction unit corrects a position of the one control point determined to be corrected by the determination unit to a position of the intersection point.

3. The inspection apparatus according to claim 1, wherein which of an approximate straight line and an approximate curved line is to be used as the approximate line is determined based on a sheet size of the print product.

4. The inspection apparatus according to claim 3, wherein in a case where length of sides of the print product in a main scanning direction and length of sides of the print product in a sub scanning direction are both equal to or larger than respective associated predetermined values, the approximate curved line is used for both of the approximate line of the column and the approximate line of the row.

5. The inspection apparatus according to claim 4, wherein in a case where the length of the sides of the print product in the main scanning direction is equal to or larger than an associated one of the predetermined values and the length of the sides of the print product in the sub scanning direction is smaller than the associated one of the predetermined values, the approximate curved line is used for the approximate line of the column and the approximate straight line is used for the approximate line of the row.

6. The inspection apparatus according to claim 4, wherein in a case where the length of the sides of the print product in the main scanning direction is smaller than an associated one of the predetermined values and the length of the sides of the print product in the sub scanning direction is equal to larger than the associated one of the predetermined values, the approximate straight line is used for the approximate line of the column and the approximate curved line is used for the approximate line of the row.

7. The inspection apparatus according to claim 4, wherein in a case where the length of the sides of the print product in the main scanning direction and the length of the sides of the print product in the sub scanning direction are smaller than the respective associated predetermined values, the approximate straight line is used for both of the approximate line of the column and the approximate line of the row.

8. The inspection apparatus according to claim 1, wherein the approximate line calculation unit calculates reliability information of control points positioned in a same column or row as the one control point, and calculates the approximate line of the column and the approximate line of the row based on the reliability information.

9. The inspection apparatus according to claim 8, wherein the reliability information is an average value of edge intensity values in respective areas around the control points positioned in the same column or row as the one control point, and as the average value is larger, the reliability is higher.

10. The inspection apparatus according to claim 8, wherein calculation of the approximate line of the column and the approximate line of the row based on the reliability information is performed by a method of using only control points which are higher in reliability than a predetermined value, for the calculation of the approximate line of the column and the approximate line of the row.

11. The inspection apparatus according to claim 8, wherein calculation of the approximate line of the column based on the reliability information is performed by a method of calculating, in a case where the number of control points which are positioned in the same column as the one control point and are higher in reliability than a predetermined value is smaller than a predetermined value, the approximate line of the column by using all control points positioned in the same column as the one control point and translationally moving the approximate line of the column such that the approximate line passes one, which is largest in reliability, of the control points positioned in the same column as the one control point.

12. The inspection apparatus according to claim 8, wherein calculation of the approximate line of the row based on the reliability information is performed by a method of calculating, in a case where the number of control points which are positioned in the same row as the one control point and are higher in reliability than a predetermined value is smaller than a predetermined value, the approximate line of the row by using all control points positioned in the same row as the one control point and translationally moving the approximate line of the row such that the approximate line passes one, which is largest in reliability, of the control points positioned in the same row as the one control point.

13. A method of controlling an inspection apparatus that inspects, based on a reference image registered in advance, whether there is a defect in a print product, comprising:

positioning a plurality of control points in a lattice form on a scanned image of the print product generated by reading the print product, for performing position matching between the scanned image and the reference image;

updating positions of the plurality of control points;

calculating an approximate line of a column based on two or more control points positioned in a same column as one control point of the plurality of control points, and an approximate line of a row intersecting the approximate line of the column based on two or more control points positioned in a same row as the one control point;

determining whether or not the one control point is to be corrected;

correcting the position of the one control point that is determined to be corrected by said determining, based on the approximate line of the column and the approximate line of the row; and inspecting whether there is a defect in the print product, by comparing a position-matched scanned image generated based on the plurality of control points including control points of which positions have been corrected by said correcting and control points of which positions have been updated by said updating, and the reference image.

14. A non-transitory computer-readable storage medium storing a program for causing a computer to execute a method of controlling an inspection apparatus that inspects, based on a reference image registered in advance, whether there is a defect in a print product, wherein the method comprises:

positioning a plurality of control points in a lattice form on a scanned image of the print product generated by reading the print product, for performing position matching between the scanned image and the reference image;

updating positions of the plurality of control points;

calculating an approximate line of a column based on two or more control points positioned in a same column as one control point of the plurality of control points, and an approximate line of a row intersecting the approximate line of the column based on two or more control points positioned in a same row as the one control point;

determining whether or not the one control point is to be corrected;

correcting the position of the one control point that is determined to be corrected by said determining, based on the approximate line of the column and the approximate line of the row; and inspecting whether there is a defect in the print product, by comparing a position-matched scanned image generated based on the plurality of control points including control points of which positions have been corrected by said correcting and control points of which positions have been updated by said updating, and the reference image.

* * * * *